(12) United States Patent
Takahama

(10) Patent No.: US 11,852,491 B2
(45) Date of Patent: Dec. 26, 2023

(54) VEHICLE CONTROL APPARATUS, VEHICLE CONTROL METHOD, AND VEHICLE CONTROL SYSTEM

(71) Applicant: Hitachi Automotive Systems, Ltd., Hitachinaka (JP)

(72) Inventor: Taku Takahama, Yokohama (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 561 days.

(21) Appl. No.: 16/610,748

(22) PCT Filed: Apr. 26, 2018

(86) PCT No.: PCT/JP2018/016927
§ 371 (c)(1),
(2) Date: Nov. 4, 2019

(87) PCT Pub. No.: WO2018/207632
PCT Pub. Date: Nov. 15, 2018

(65) Prior Publication Data
US 2020/0064138 A1 Feb. 27, 2020

(30) Foreign Application Priority Data

May 11, 2017 (JP) .................................. 2017-094355

(51) Int. Cl.
*G01C 21/30* (2006.01)
*G01C 21/36* (2006.01)
*G05D 1/00* (2006.01)

(52) U.S. Cl.
CPC ......... *G01C 21/30* (2013.01); *G01C 21/3667* (2013.01); *G05D 1/0088* (2013.01); *G05D 2201/0213* (2013.01)

(58) Field of Classification Search
CPC .. G01C 21/30; G01C 21/3667; G05D 1/0088; G05D 2201/0213
See application file for complete search history.

(56) References Cited

U.S. PATENT DOCUMENTS 9,123,152 B1 9/2015 Chatham
2012/0143886 A1* 6/2012 Okude .................. G01C 21/32
707/756

(Continued)

FOREIGN PATENT DOCUMENTS

DE 10 2012 219 475 A1 4/2013
EP 3 088 281 A1 11/2016

(Continued)

OTHER PUBLICATIONS

Kunihiro Goto, Information processing device, program, and map data updating system, 2016 (Year: 2016).*

(Continued)

*Primary Examiner* — James M McPherson
*Assistant Examiner* — Bakari Underwood
(74) *Attorney, Agent, or Firm* — Crowell & Moring LLP

(57) ABSTRACT

The present invention provides a vehicle control apparatus, a vehicle control method, and a vehicle control system capable of improving reliability of road recognition. The vehicle control apparatus includes a first road information acquisition portion configured to acquire first road information based on information regarding a map, a second road information acquisition portion configured to acquire second road information based on a vehicle behavior, a third road information acquisition portion configured to acquire third road information based on information recognized by an external world recognition sensor, a road information comparison portion configured to compare the first road information, the second road information, and the third road information acquired from the first, second, and third road information acquisition portions, respectively, and a road information determination portion configured to determine accuracy of each of the first road information, the second road information, and the third road information based on a (Continued)

result of the comparison by the road information comparison portion.

22 Claims, 18 Drawing Sheets

(56) References Cited

U.S. PATENT DOCUMENTS

| | | | |
|---|---|---|---|
| 2014/0300512 A1 | 10/2014 | Steinhardt et al. | |
| 2016/0282127 A1 | 9/2016 | Goto et al. | |
| 2016/0313738 A1 | 10/2016 | Kindo et al. | |
| 2016/0327948 A1* | 11/2016 | Taguchi | ............... G05D 1/0257 |

FOREIGN PATENT DOCUMENTS

| | | | | | |
|---|---|---|---|---|---|
| EP | 3 091 338 A1 | 11/2016 | | | |
| JP | 2003-182474 A | 7/2003 | | | |
| JP | 2011-215474 A | 10/2011 | | | |
| JP | 2013-97714 A | 5/2013 | | | |
| JP | 2016-156973 A | 9/2016 | | | |
| JP | 2016-180980 A | 10/2016 | | | |
| JP | 2016180980 A | * 10/2016 | .......... | G01C 21/005 |
| JP | 2016-203882 A | 12/2016 | | | |

OTHER PUBLICATIONS

International Search Report (PCT/ISA/210) issued in PCT Application No. PCT/JP2018/016927 dated Jul. 31, 2018 with English translation (five (5) pages).
Japanese-language Written Opinion (PCT/ISA/237) issued in PCT Application No. PCT/JP2018/016927 dated Jul. 31, 2018 (five (5) pages).
Extended European Search Report issued in European Application No. 18799117.9 dated Feb. 13, 2020 (seven (7) pages).
English translation (Japanese-language Written Opinion (PCT/ISA/237) previously filed on Nov. 4, 2019) issued in PCT Application No. PCT/JP2018/016927 dated Jul. 31, 2018 (nine (9) pages).

* cited by examiner

VEHICLE CONTROL APPARATUS, VEHICLE CONTROL METHOD, AND VEHICLE CONTROL SYSTEM

TECHNICAL FIELD

The present invention relates to a vehicle control apparatus, a vehicle control method, and a vehicle control system.

BACKGROUND ART

PTL 1 discloses a technique that, when there is a difference between road information based on a map database and road information based on sensing, prevents incorrect recognition of the road information based on the sensing by masking information indicating a position or a shape easily changeable in the map database.

CITATION LIST

Patent Literature

[PTL 1] Japanese Patent Application Public Disclosure No. 2011-215474

SUMMARY OF INVENTION

Technical Problem

However, the above-described conventional technique involves such a problem that reliability of the road recognition reduces when the road information based on the sensing contains an error, because the road information is recognized assuming that the road information based on the sensing is correct any time.

One of objects of the present invention is to provide a vehicle control apparatus, a vehicle control method, and a vehicle control system capable of improving the reliability of the road recognition.

Solution to Problem

According to one aspect of the present invention, a vehicle control apparatus compares first road information based on information regarding a map, second road information based on a vehicle behavior, and third road information based on information recognized by an external world recognition sensor, and determines accuracy of each of the first road information, the second road information, and the third road information based on a result of the comparison.

Therefore, the present invention can improve the reliability of the road recognition.

DESCRIPTION OF EMBODIMENTS

First Embodiment

Figure 1:
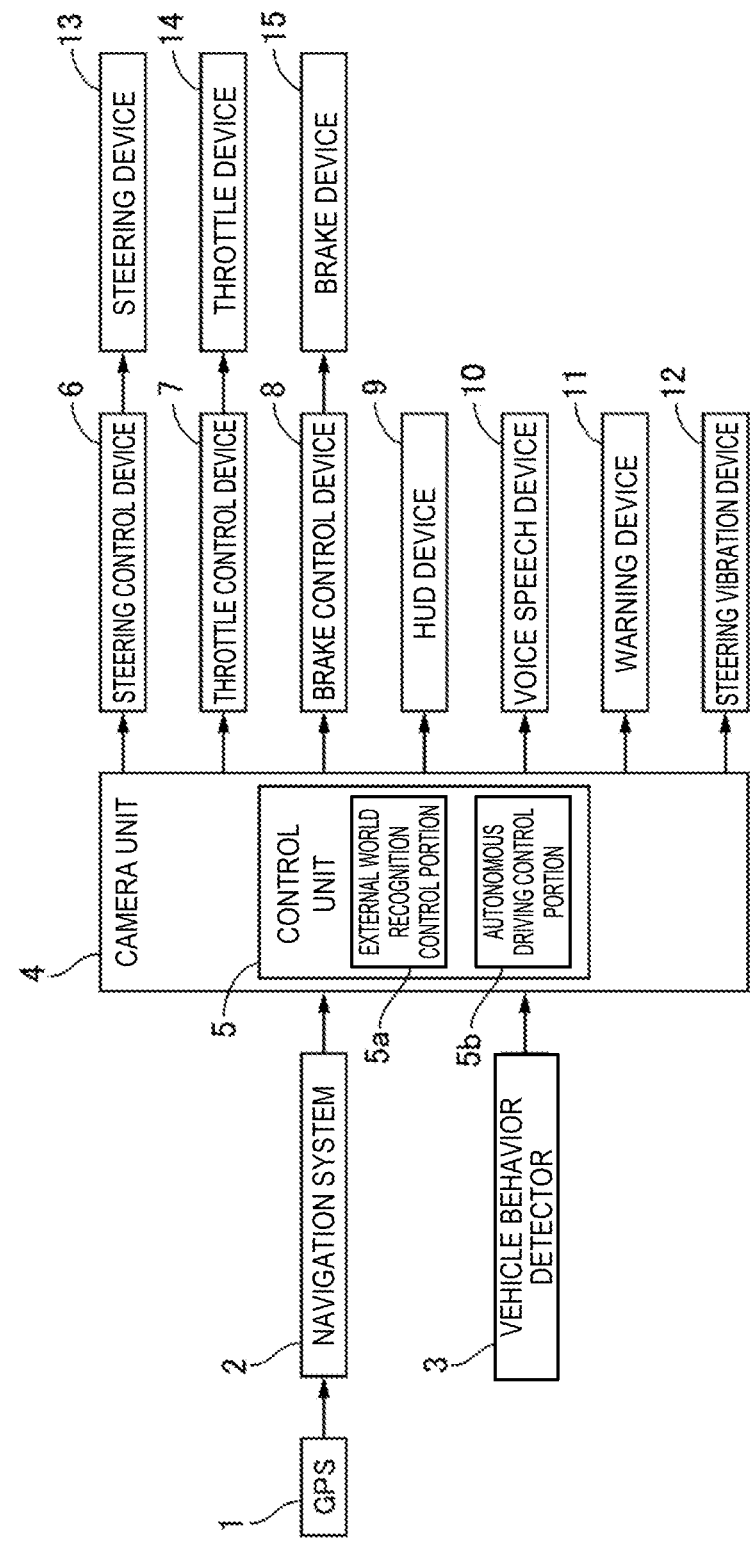
FIG. 1 illustrates a configuration of a vehicle control system according to first to third embodiments.

FIG. 1 illustrates a configuration of a vehicle control system according to a first embodiment.

The vehicle control system according to the first embodiment is mounted on a vehicle that uses an engine as a power source thereof.

A GPS 1 measures a positional relationship between a subject vehicle and a plurality of satellites (GPS satellites), and calculates a current position (a latitude and a longitude) and an advancing direction of the subject vehicle.

A navigation system 2 graphically develops a road map around the subject vehicle (information regarding a map) based on the current position of the subject vehicle and map information, and displays a map screen (a navigation screen) on which a mark indicating the current position of the subject vehicle is superimposed on a liquid crystal display or an HUD device 9, which will be described below. Further, when a destination is input by a driver, the navigation system 2 searches for an optimum guide route connecting the current position and the destination in consideration of traffic information and the like, and displays the guide route on the navigation screen in an superimposed manner and also guides the driver with use of the display on the liquid crystal display and the HUD device 9 and/or a speech by a voice speech device 10, which will be described below. Further, when the subject vehicle approaches a branch (an intersection or the like) at which the subject vehicle should change a driving direction thereof, the navigation system 2 displays a turn-by-turn image (an arrow icon or the like) on the navigation screen and also guides the driver so as to change the driving direction with use of the speech of the voice speech device 10.

A vehicle behavior detector 3 detects a vehicle behavior of the subject vehicle based on respective sensor signals of a steering angle sensor that detects a steering angle of a steering wheel, a turning angle sensor that detects a turning angle of a front wheel, a vehicle speed sensor that detects a vehicle speed, a lateral G sensor that detects a lateral G, a yaw rate sensor that detects a yaw rate, a turn signal, and the like.

A camera unit (an external world recognition sensor) 4 detects each object existing ahead of the subject vehicle based on an image ahead of the subject vehicle that is captured by a stereo camera (left and right CMOSs), and calculates a distance to each object individually. The camera unit 4 includes a control unit (a vehicle controller) 5.

The control unit 5 recognizes a circumstance around the subject vehicle based on the information acquired by the navigation system 2, the vehicle behavior detector 3, and the camera unit 4. The control unit 5 drives each actuator of the subject vehicle based on the recognized circumstance around the subject vehicle and carries out autonomous driving during an autonomous driving mode. The control unit 5 includes an external world recognition control portion 5a and an autonomous driving control portion 5b as a configuration for realizing the above-described circumstance recognition function and autonomous driving function.

The external world recognition control portion 5a recognizes the circumstance (an external world) around the subject vehicle based on the current position of the subject vehicle, the vehicle behavior of the subject vehicle, and the shape of each object and the distance to each object. Examples of the circumstance around the subject vehicle include a road shape (a curvature, a slope, and a road width), a moving object (a pedestrian, a bicycle, a motorcycle, another vehicle, and the like), and a stationary object (a dropped object on a road, a traffic light, a guardrail, a curb, a road sign, a road surface marking, a lane marking of a running road, a tree, and the like). Details of the external world recognition control portion 5a will be described below.

The autonomous driving control portion 5b controls the steering and the vehicle speed so as to cause the subject vehicle to autonomously run based on the guide route independently of a driving operation (a steering wheel operation and a pedal operation) performed by the driver based on the circumstance around the subject vehicle that is recognized by the external world recognition control portion 5a during the autonomous driving mode. More specifically, the autonomous driving control portion 5b calculates a target turning angle of the front wheel in the steering control and also calculates a target vehicle speed of the subject vehicle in the vehicle speed control based on the environment surrounding the subject vehicle and the vehicle behavior of the subject vehicle during the autonomous driving mode. The driver can select the autonomous driving mode and a manual driving mode by operating a switch or the like.

A steering control device 6 drives a steering device 13 that turns the front wheel in such a manner that the turning angle of the front wheel matches the target turning angle.

A throttle control device 7 drives a throttle device 14 that opens and closes a throttle valve in such a manner that the vehicle speed of the subject vehicle matches the target vehicle speed.

A brake control device 8 drives a brake device 15 that provides a braking force to each wheel in such a manner that the vehicle speed of the subject vehicle matches the target vehicle speed.

The HUD device 9 displays vehicle information such as the vehicle speed, the route guide of the navigation system 2, and the like on a windshield of the subject vehicle as a virtual image.

The voice speech device 10 speaks various kinds of warnings, the route guide of the navigation system 2, and the like as a synthesized voice.

A warning device 11 issues various kinds of warnings by outputting a warning sound.

A steering vibration device 12 issues various kinds of warnings by vibrating the steering wheel.

In the first embodiment, the external world recognition control portion 5a calculates a shape (a curvature radius) of a road on which the subject vehicle will pass through with use of each of three different methods and compares the three results to determine accuracy (a likelihood) of each of the road shapes by a majority vote with the aim of improving the reliability of the road recognition. The external world recognition control portion 5a stores a corrected content of information determined not to be likely based on a shape determined to be likely together with the position of the subject vehicle (a running location) and the advancing direction of the vehicle. The external world recognition control portion 5a reflects the stored corrected content to the recognition of the road shape when the subject vehicle runs through the stored running location in the same direction as the stored advancing direction in the autonomous driving mode. As a result, when the subject vehicle runs again in the autonomous driving mode on the road on which the subject vehicle has previously run, the vehicle control system can prevent incorrect recognition by the external world recognition control portion 5a that might be caused under an influence of the characteristics specific to this road (the curvature radius, the slope shape, a painted state of the road surface, a stain on the road surface such as a repair mark and a brake mark, and the like), thereby improving the reliability of the autonomous driving.

Figure 2:
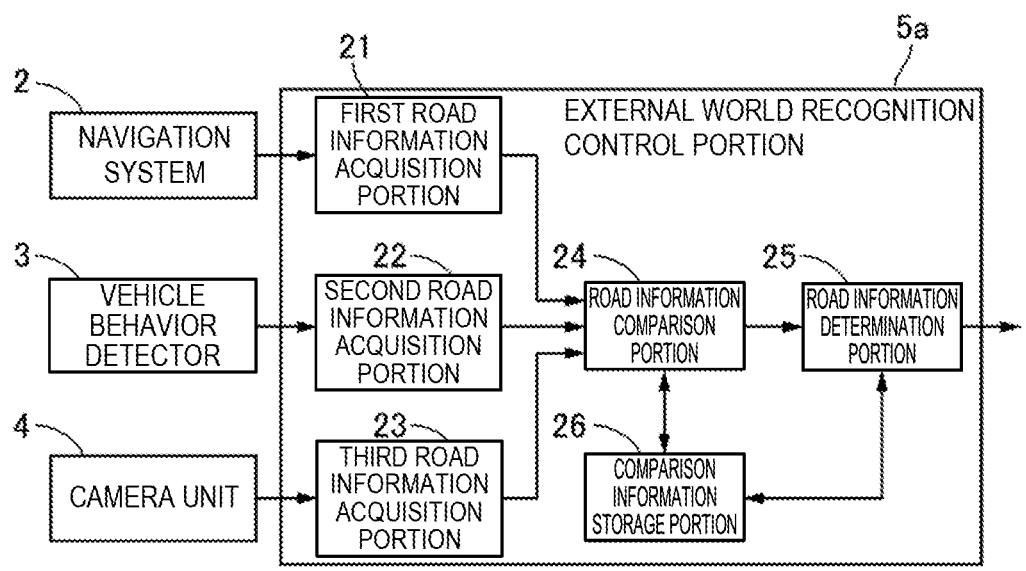
FIG. 2 illustrates a configuration of an external world recognition control portion 5*a* according to the first to third embodiments.

FIG. 2 illustrates a configuration of the external world recognition control portion 5a according to the first embodiment.

A first road information acquisition portion 21 calculates a curvature radius R1 [m] of a road on which the subject vehicle passes through based on the road map of the navigation system 2 as a first road shape. The first road shape R1 is, for example, defined to be a curvature radius of a circle passing through three nodes on a front side and a back side of the road on which the subject vehicle passes through.

A second road information acquisition portion 22 calculates a curvature radius R2 [m] of the road on which the subject vehicle passes through based on the vehicle behavior of the subject vehicle that is detected by the vehicle behavior detector 3 as a second road shape. The second road shape R2 is a turning radius of the subject vehicle, and is, for example, calculated with use of the following equation (1) based on a turning angle δ [rad] of the front wheel and a vehicle speed V [m/s].

$$R2 = \{(1+AV^2)L\}/\delta \quad (1)$$

In the equation (1), A represents a stability factor [$s^2/m^2$], and L represents a wheelbase [m]. The turning angle δ may be calculated from a steering angle θ and a steering gear ratio.

Alternatively, R2 may be calculated with use of the following equation (2) instead of the equation (1).

$$R2 = V/\gamma \quad (2)$$

In the equation (2), γ represents a yaw rate [rad/s].

A third road information acquisition portion 23 calculates a curvature radius R3 [m] of the road on which the subject vehicle passes through based on the shape of the road that is detected by the camera unit 4 as a third road shape. When a lane marker (a lane marking of the road on which the subject vehicle is running) is detected only on one of the left side and the right side of the traffic lane, a curvature radius of this lane marker is acquired as the third road shape R3. When the lane marker is detected on each of both the left side and the right side of the traffic lane, an average value of the curvature radii of the left and right lane markers is acquired as the third road shape R3.

A road information comparison portion 24 compares the first road shape R1, the second road shape R2, and the third road shape R3 acquired from the first road information acquisition portion 22, the second road information acquisition portion 23, and the third road information acquisition portion 24, respectively. In a case where the road shape is a straight road when each of the road shapes is compared, the comparison is impossible because the curvature radius becomes ∞ [m], and therefore the road shape is compared based on a curvature [1/m], which is the reciprocal. The road information comparison portion 24 replaces the value of each of the road shapes R1, R2, R3 with the reciprocal, i.e., the curvature, and calculates absolute values abs(R1−R2), abs(R1−R3), and abs(R2−R3) of differences of the respective curvatures. The road information comparison portion 24 compares the absolute value of each of the differences and a threshold value for the difference. As a specific example thereof, for example, suppose that the curvatures are R1=1/−100000=−0.00001, R2=1/−5000=−0.0002, and R3=1/−600=−0.0015. A positive sign is added to a leftward curve, and a negative sing is added to a rightward curve. In this case, the absolute values abs(R1−R2), abs(R1−R3), and abs(R2−R3) of the differences of the respective curvatures are determined to be abs(R1−R2)=0.00019, abs(R1−R3)=0.00166, and abs(R2−R3)=0.00147.

A road information determination portion 25 determines the accuracy of each of the road shapes by the majority vote of the result of the comparison by the road information comparison portion 24. If one absolute value of the difference is equal to or smaller than the threshold value among the absolute values abs(R1−R2), abs(R1−R3), and abs(R2−R3) of the respective differences, the road information determination portion 25 determines that the two curvatures used in the calculation of the absolute value of this difference have high accuracy, and determines that the remaining one curvature has low accuracy. In the above-described specific example, only abs(R1−R2) is equal to or smaller than the threshold value, assuming that the threshold value is set to 0.001. In other words, because of R1≈R2, R1≠R3, and R2≠R3, the road information determination portion 25 can determine that R1 and R2 have high accuracy, and R3 has low accuracy. The description will be further developed assuming that three pieces of information are compared in the present embodiment, but, for example, use of an external world recognition sensor capable of detecting both the traffic lane and the edge of the road would lead to a comparison among four pieces of information. Even in this case, a similar result can also be achieved by taking a majority vote by the road information comparison portion 24, and handling them in a similar manner to the comparison among the three pieces of information if only one of them is confirmed to be low accurate information.

A comparison information storage portion 26 stores the result of the determination about each of the road shapes that is made by the road information determination portion 25. The comparison information storage portion 26 includes a nonvolatile memory (for example, an EEPROM) that does not lose stored data even when the vehicle is powered off.

Figure 3:
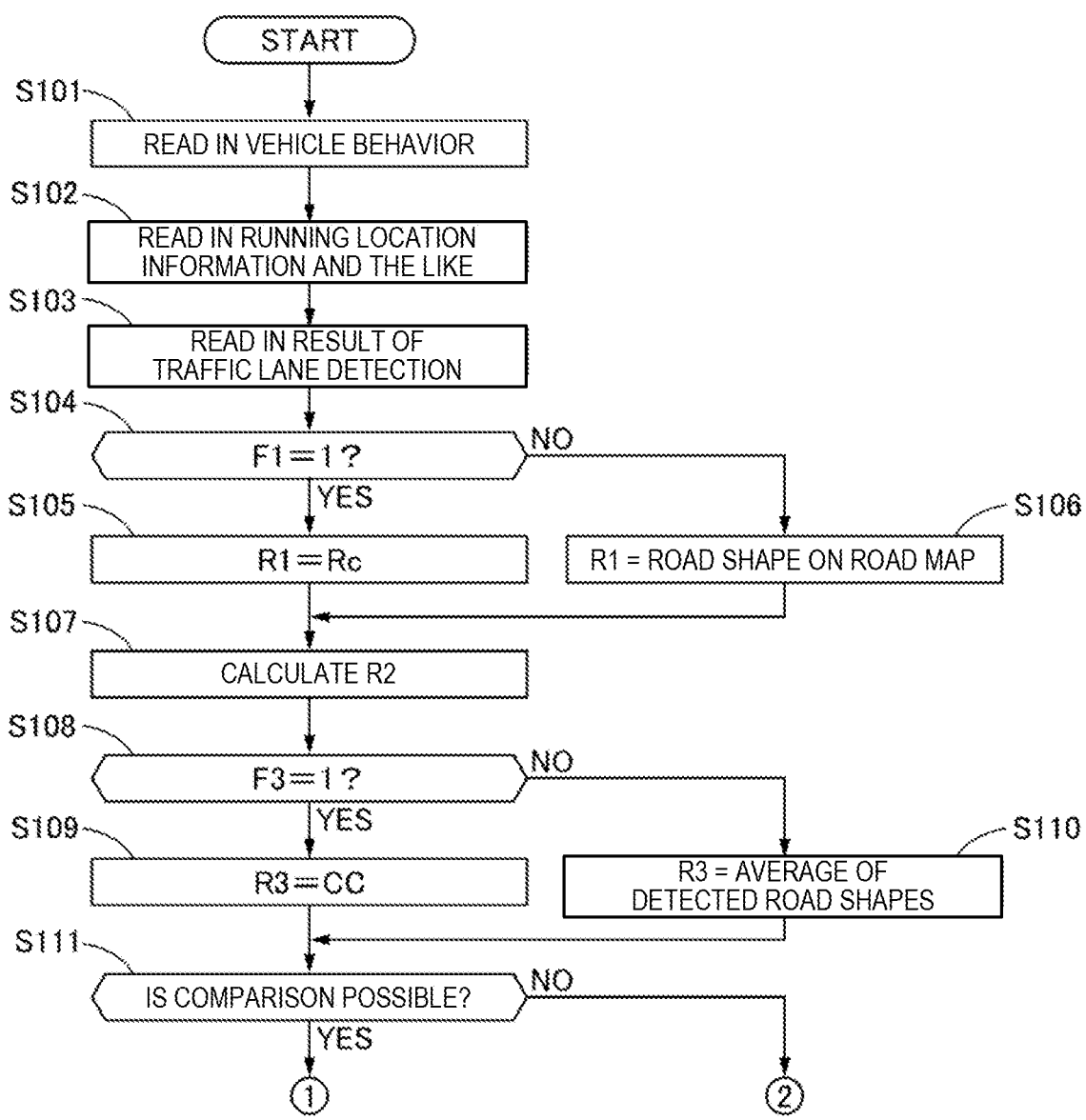
FIG. 3 is a flowchart illustrating a flow of control by the external world recognition control portion 5*a* according to the first and third embodiments.
Figure 4:
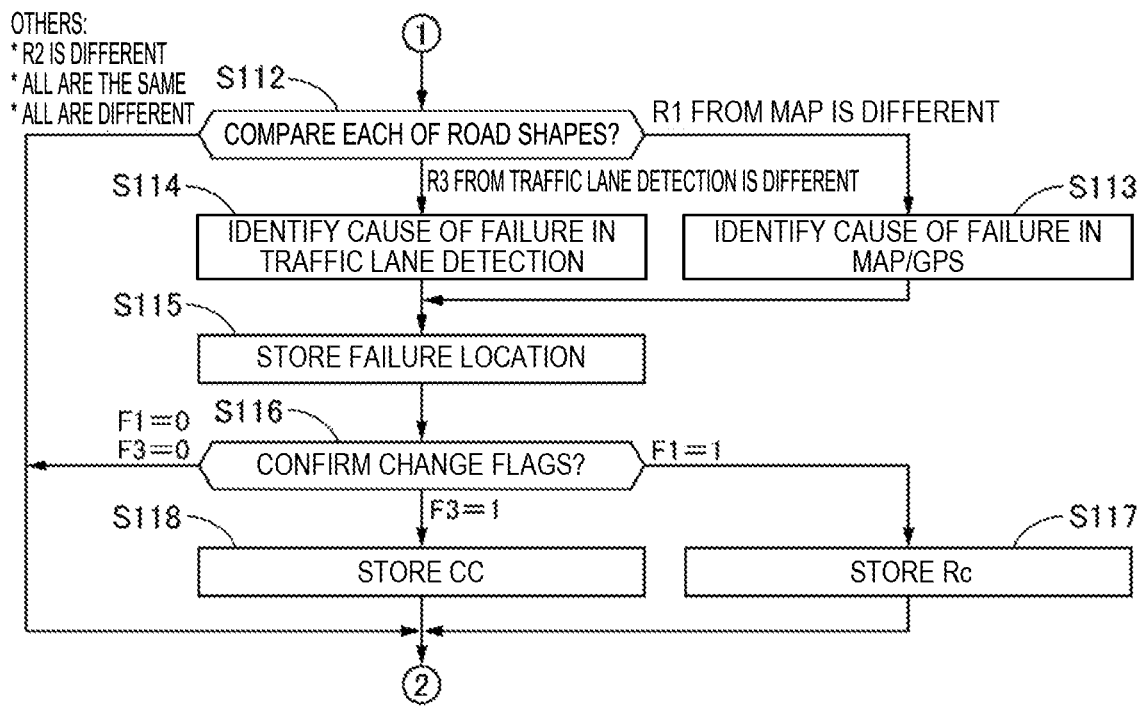
FIG. 4 is a flowchart illustrating the flow of the control by the external world recognition control portion 5*a* according to the first embodiment.
Figure 5:
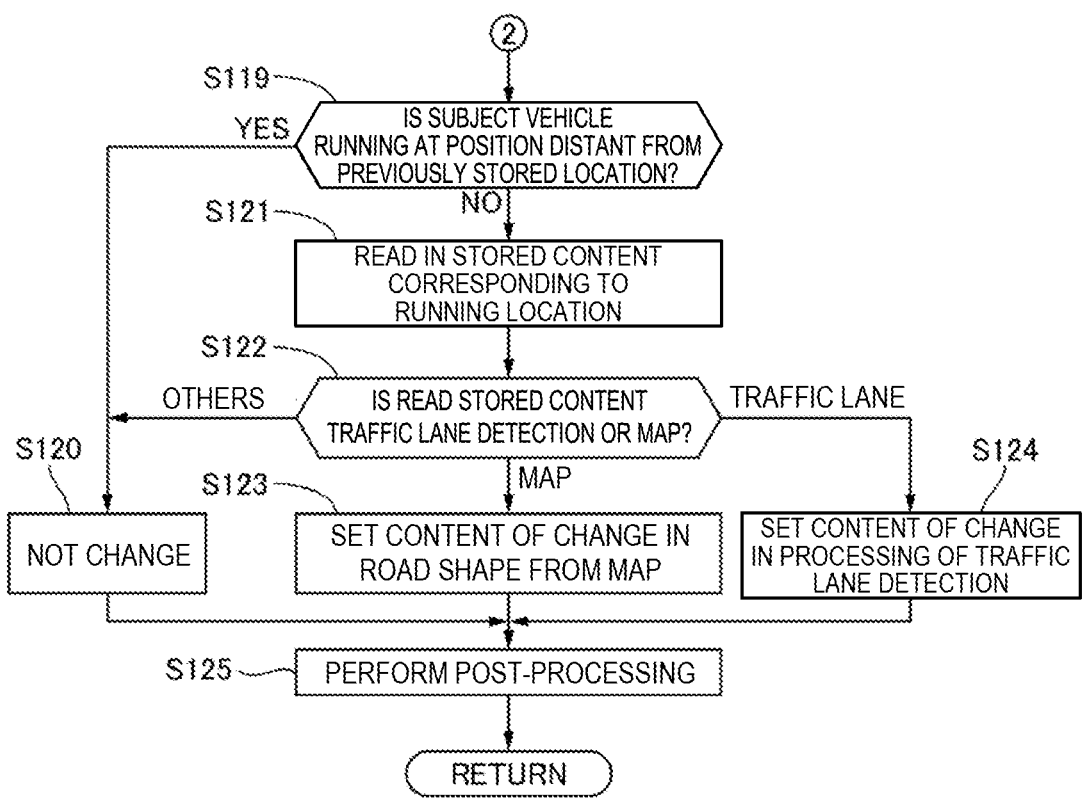
FIG. 5 is a flowchart illustrating the flow of the control by the external world recognition control portion 5*a* according to the first and third embodiments.

FIGS. 3, 4, and 5 are flowcharts illustrating a flow of control by the external world recognition control portion 5a according to the first embodiment. This processing is performed, for example, every 50 ms immediately after an image processing task by the camera unit 4.

In S101, the second road information acquisition portion 22 reads in the vehicle behavior of the subject vehicle that is detected by the vehicle behavior detector 3 (second road information acquisition step).

In S102, the first road information acquisition portion 21 reads in the current running location information of the subject vehicle (the latitude, the longitude, the advancing direction, and the like) from the navigation system 2, and compares it with the road map to read in presence/absence of a branch road and a direction of the branch (leftward/rightward) (first road information acquisition step). In practice, the acquired information is corrected with use of a longitudinal speed and a lateral speed of the subject vehicle acquired in S101 based on the most recently received latitude and longitude as a starting location for the correction.

In S103, the third road information acquisition portion 23 reads in the curvature radius of the lane marker and the position of the lane where the subject vehicle is running (a right/left lane or the like) as a result of the traffic lane detection by the camera unit 4 (third road information acquisition step).

In S104, the road information comparison portion 24 determines whether a road information change flag F1 is F1=1. If the determination in S104 is YES, the processing proceeds to S105. If the determination in S104 is NO, the processing proceeds to S106.

In S105, the road information comparison portion 24 sets a corrected road shape Rc stored in the comparison information storage portion 26 as the first road shape R1.

In S106, the first road information acquisition portion 21 acquires the first road shape R1 [m] by comparing the read latitude, longitude, and advancing direction with the road map.

In S107, the second road information acquisition portion 22 calculates the second road shape R2 with use of the equation (1) from the turning angle δ [rad] of the front wheel and the vehicle speed V [m/s]. The second road shape R2 may be calculated with use of the equation (2) from the vehicle speed V and the yaw rate γ [rad/s].

In S108, the road information comparison portion 24 determines whether a traffic lane detection change flag F3 is F3=1. If the determination in S108 is YES, the processing proceeds to S109. If the determination in S108 is NO, the processing proceeds to S110.

Figure 6:
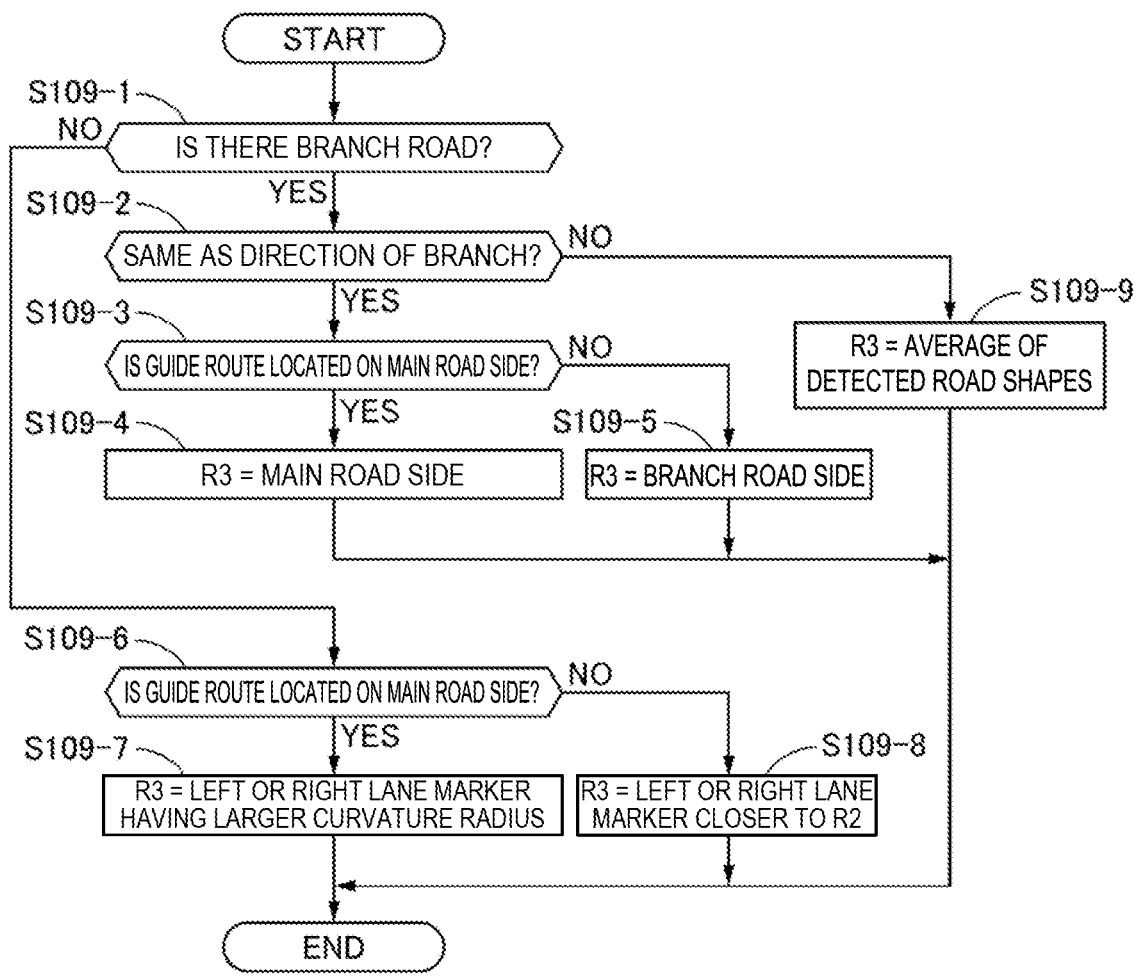
FIG. 6 is a flowchart illustrating a flow of processing in S109 in FIG. 3.

In S109, the road information comparison portion 24 calculates the third road shape R3 based on a detection processing change content CC stored in the comparison information storage portion 26. FIG. 6 illustrates a flow of the processing.

In S109-1, the road information comparison portion 24 determines whether there is a branch road in the vicinity from the current running location information. If the determination in S109-1 is YES, the processing proceeds to S109-2. If the determination in S109-1 is NO, the processing proceeds to S109-6.

In S109-2, the road information comparison portion 24 determines whether the position of the lane where the subject vehicle is running that is acquired from the result of the traffic lane detection matches a direction of the branch acquired from the road map. If the determination in S109-2 is YES, the processing proceeds to S109-3. If the determination in S109-2 is NO, the processing proceeds to S109-9.

In S109-3, the road information comparison portion 24 determines whether the guide route of the navigation system 2 is located on a main road side (a straight-ahead side). If the determination in S109-3 is YES, the processing proceeds to S109-4. If the determination in S109-3 is NO, the processing proceeds to S109-5. When the guide route is not set, the guide route is handled as being located on the main road side. Further, as the determination about the straight-ahead side, the straight-ahead side may be determined if the first road shape R1>1000.

In S109-4, the road information comparison portion 24 calculates the third road shape R3 with use of the following equation (3), and the present control is ended. if (the position of the lane where the subject vehicle is running=the leftmost traffic lane)

$$\{R3=R\_R\}\text{else}\{R3=R\_L\} \tag{3}$$

In the equation (3), if (condition) {eq1}else{eq2} is a function that executes eq1 if "condition" is "true" and executes eq2 if "condition" is "false". Further, R_R represents a curvature radius of the lane marker on the right side, and R_L represents a curvature radius of the lane marker on the left side.

In other words, the curvature radius of the lane marker on the main road side is set as the third road shape R3 when there is a branch road in the vicinity, the driver intends to move ahead on the main road side, and the lane where the subject vehicle is running is connected to the branch road.

In S109-5, the road information comparison portion 24 calculates the third road shape R3 with use of the following equation (4), and the present control is ended. if (the position of the lane where the subject vehicle is running=the leftmost traffic lane)

$$\{R3=R\_L\}\text{else}\{R3=R\_R\} \tag{4}$$

In other words, the curvature radius of the lane marker on the branch road side is set as the third road shape R3 when there is a branch road in the vicinity, the driver intends to move ahead on the branch road side, and the lane where the subject vehicle is running is connected to the branch road.

In S109-6, the road information comparison portion 24 determines whether the guide route of the navigation system 2 is located on the straight-ahead side. If the determination in S109-6 is YES, the processing proceeds to S109-7. If the determination in S109-6 is NO, the processing proceeds to S109-8. When the guide route is not set, the guide route is handled as being located on the straight-ahead side.

In S109-7, the road information comparison portion 24 calculates the third road shape R3 with use of the following equation (5), and the present control is ended.

$$\text{if}(R\_L>R\_R)\{R3=R\_L\}\text{else}\{R3=R\_R\} \tag{5}$$

In other words, the one of the left and right lane markers that has a larger curvature radius is set as the third road shape R3 when there is no branch road in the vicinity and the driver intends to go straight ahead.

In S109-8, the road information comparison portion 24 calculates the third road shape R3 with use of the following equation (6), and the present control is ended.

$$\text{if}(\text{abs}(R\_L-R2)<\text{abs}(R\_R-R2)) \\ \{R3=R\_L\}\text{else}\{R3=R\_R\} \tag{6}$$

In the equation (6), $\text{abs}(\alpha)$ is a function that calculates an absolute value of $\alpha$.

In other words, the lane marker closer to the curvature radius R1 converted from the map information is set as the third road shape R3, when there is no branch road in the vicinity and the driver intends not to go straight ahead.

In S109-9, the third road information acquisition portion 23 calculates the road shape R3 with use of the following equation (7).

$$R3=(R\_L+R\_R)/2 \tag{7}$$

In S110, the third road information acquisition portion 23 calculates the road shape R3 with use of the equation (7).

In S111, the road information comparison portion 24 determines whether each of the road shapes R1, R2, and R3 can be compared. If the determination in S111 is YES, the processing proceeds to S112. If the determination in S111 is NO, the processing proceeds to S119. The road information comparison portion 24 determines that each of the road shapes R1, R2, and R3 can be compared if both the following two conditions are satisfied.

*The lane marker can be detected on each of both the left and right sides.

*Precision of matching between the GPS 1 and the map information (locater precision, such as the fact that the position on the map indicated by the GPS1 is a road) is excellent.

In S112, the road information comparison portion 24 compares each of the road shapes R1, R2, and R3, and the processing proceeds to the following step according to a result of the comparison (a road information comparison step). If the result of the comparison is R1≠R2, R1≠R3, and R2≈R3, i.e., R2 and R3 are the same as or similar to each other and R1 is different from R2 and R3, the processing proceeds to S113. If the result of the comparison is R1≈R2, R1≠R3, and R2≠R3, i.e., R1 and R2 are the same as or similar to each other and R3 is different from R1 and R2, the processing proceeds to S114. Otherwise, i.e., if R1 and R3 are the same as or similar to each other and R2 is different from R1 and R3, or all of R1, R2, and R3 are the same as or different from one another, the processing proceeds to S119. If the result of the comparison is R1≈R3, R1≠R2, and R2≠R3, the road information determination portion 25 determines non-normal running. The non-normal running means running deviating from the road (the guide route in the case of the autonomous driving), such as emergency avoidance. Normal running means running along the road (or the guide route).

In S113, the road information determination portion 25 determines that the first road shape R1 based on the road map has low accuracy, i.e., an error is contained in the map information, and sets the map information change flag F1=1 and the corrected road shape Rc=(R2+R3)/2 (a road information determination step).

Figure 7:
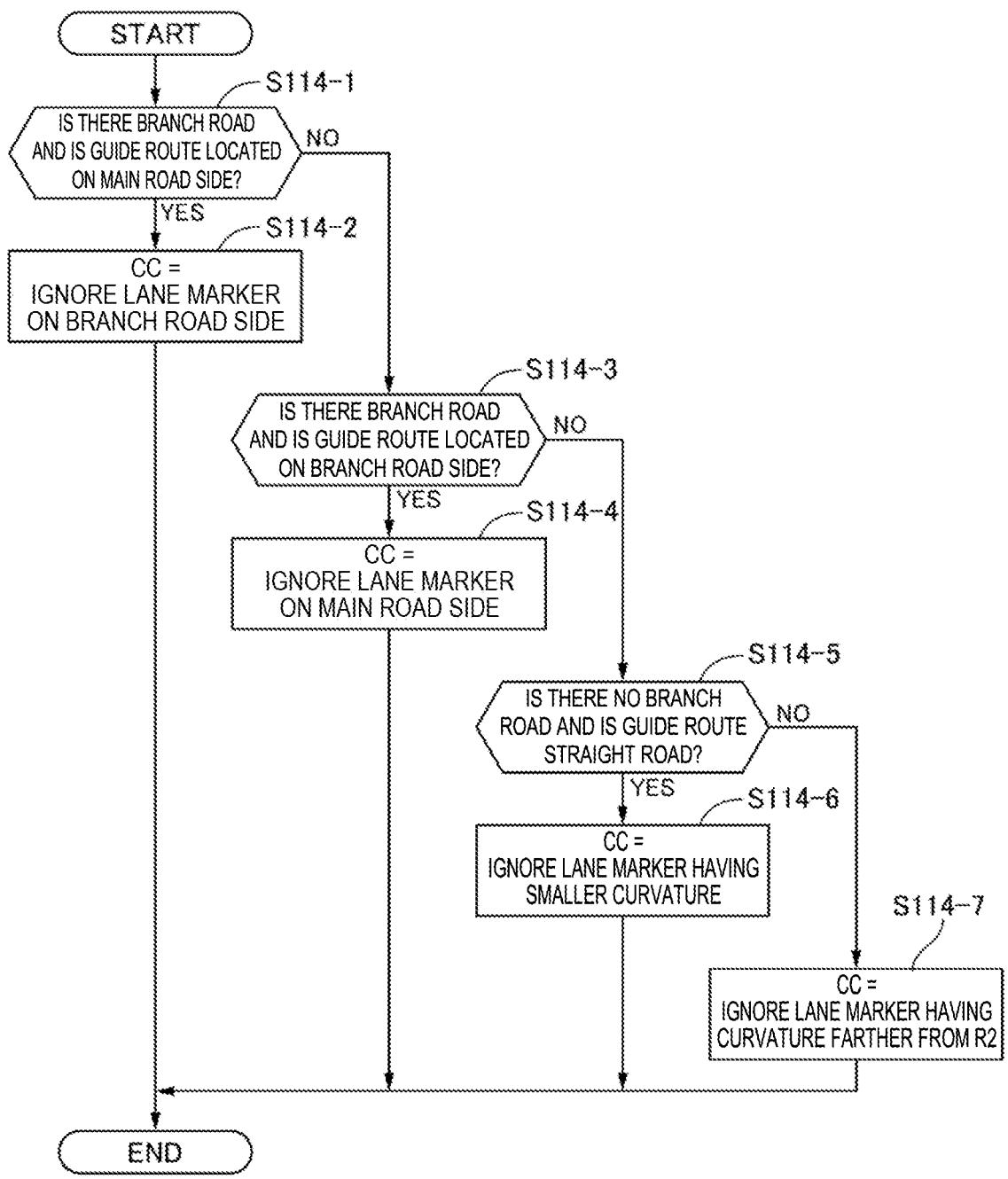
FIG. 7 is a flowchart illustrating a flow of processing in S114 in FIG. 4.

In S114, the road information determination portion 25 determines that the third road shape R3 based on the result of the traffic lane detection has low accuracy, i.e., the camera unit 4 incorrectly recognizes the road shape, and sets the detection processing change content CC (the road information determination step). FIG. 7 illustrates a flow of the processing.

In S114-1, the road information determination portion 25 determines whether there is a branch road in the vicinity based on the map information, and whether the guide route of the navigation system 2 is located on the main road side (the straight-ahead side). If the determination in S114-1 is YES, the processing proceeds to S114-2. If the determination in S114-2 is NO, the processing proceeds to S114-3.

In S114-2, the road information determination portion 25 sets the detection processing change content CC to "ignore the lane marker on the branch road side when the subject vehicle is running in the traffic lane on the branch road side", and the present control is ended.

In S114-3, the road information determination portion 25 determines whether there is a branch road in the vicinity based on the map information, and whether the guide route of the navigation system 2 is located on the branch road side (a curve side). If the determination in S114-3 is YES, the processing proceeds to S114-4. If the determination in S114-3 is NO, the processing proceeds to S114-5.

In S114-4, the road information determination portion 25 sets the detection processing change content CC to "ignore the lane marker on the main road side when the subject vehicle is running in the traffic lane on the branch road side", and the present control is ended.

In S114-5, the road information determination portion 25 determines whether there is no branch road in the vicinity based on the map information, and whether the guide route of the navigation system 2 is a straight road. If the determination in S114-5 is YES, the processing proceeds to S114-6. If the determination in S114-5 is NO, the processing proceeds to S114-7. Further, as the determination about the straight-ahead side, the straight-ahead side may be determined if the first road shape R1>1000.

In S114-6, the road information determination portion 25 sets the detection processing change content CC to "ignore the one of the left and right lane markers that has a smaller curvature radius", and the present control is ended.

In S114-7, the road information determination portion 25 sets the detection processing change content CC to "ignore the one of the left and right lane markers that has a curvature radius farther from R1", and the present control is ended.

In S115, the comparison information storage portion 26 stores the latitude, the longitude, and the advancing direction of the vehicle at the current running location (a failure location) (comparison information storage step).

In S116, the road information determination portion 25 checks the map information change flag F1 and the traffic lane detection change flag F3, and the processing proceeds to S117 if the map information change flag F1 is F1=1, proceeds to S118 if the traffic lane detection change flag F3 is F3=1, and proceeds to S119 if these flags are F1=0 and F3=0.

In S117, the comparison information storage portion 26 stores the map information change flag F1 and the corrected road shape Rc (the comparison information storage step).

In S118, the comparison information storage portion 26 stores the traffic lane detection change flag F3 and the detection processing change content CC (the comparison information storage step).

The comparison information storage portion 26 deletes both of them to prevent error storage if overwriting them. The comparison information storage portion 26 may count the number of times, and keep only the one of them that corresponds to a higher count.

In S119, the road information determination portion 25 determines whether the location where the subject vehicle is currently running is separated by more than a predetermined distance with respect to all latitudes, longitudes, and advancing directions of the vehicle stored in the comparison information storage portion 26. The processing proceeds to S120 if this location is separated by more than the predetermined distance, and proceeds to S121 if this location is separated by the predetermined distance or less.

In S120, the road information determination portion 25 sets the map information change flag F1=0 and the traffic lane detection change flag F3=0, and disables both the corrected road shape Rc and the detection processing change content CC.

In S121, the road information determination portion 25 reads in a stored content close to the current running location and the advancing direction from the comparison information storage portion 26.

In S122, the road information determination portion 25 determines the read storage content. The processing proceeds to S123 if this content indicates the map information change flag F1=1, proceeds to S124 if the traffic lane detection change flag F3=1, and proceeds to S120 if the flanges are F1=0 and F3=0.

In S123, the road information determination portion 25 sets the map information change flag F1=1, sets the stored corrected road shape (R2+R3)/2 as the corrected road shape Rc, sets the traffic lane detection change flag F3=0, and disables the stored detection processing change content CC.

In S124, the road information determination portion 25 sets the map information change flag F1=0, disables the stored corrected road shape Rc, sets the traffic lane detection change flag F3=1, and sets the stored detection processing change content as the detection processing change content CC.

In S125, the road information determination portion 25 performs post-processing. Then, the processing proceeds to RETURN. The post-processing is, for example, an update of a previous value in a low-pass filter calculation on a yaw rate sensor value.

The autonomous driving control portion 5b carries out a calculation regarding lateral control of the subject vehicle with use of the third road shape R3 or the like acquired in S109 or S110, and outputs the target turning angle, which is an output thereof, to the steering controller 6, which is a stage subsequent thereto.

Next, advantageous effects of the first embodiment will be described.

In the external world recognition control portion 5a, the road information comparison portion 24 calculates each of the first road shape R1 based on the road map, the second road shape R2 based on the vehicle behavior of the subject vehicle, and the third road shape R3 based on the result of the traffic lane detection by the camera unit 4, and compares the three shapes (S112). The road information determination portion 25 determines the accuracy of each of the road shapes R1, R2, and R3 by the majority vote of the result of the comparison (S113 and S114). Comparing the road shapes R1, R2, and R3 acquired by the different three methods and following the majority vote allows the vehicle control system to determine a highly reliable road shape and a less reliable road shape among R1, R2, and R3. Therefore, the vehicle control system can determine the road shape further appropriately compared to the conventional apparatus that compares only two of R1, R2, and R3, thereby improving the reliability of the road recognition.

The road information determination portion 25 determines that the road shape based on the camera unit 4 is the incorrect recognition in S114, when the road information comparison portion 24 determines R1≈R2, R1≠R3, and R2≠R3 in S112. When only R3 based on the result of the traffic lane detection is different, it is highly likely that an error is contained in the traffic lane detection determining R3, and therefore the vehicle control apparatus can determine that the road shape based on the camera unit 4 is the incorrect recognition.

The road information determination portion 25 determines that an error is contained in the map information in S113, when the road information comparison portion 24 determines R1≠R2, R1≠R3, and R2≈R3 in S112. When only R1 based on the map information is different, it is highly likely that an error is contained in the road map determining R1, and therefore the vehicle control apparatus can determine the incorrect recognition of the road shape based on the road map.

Figure 8:
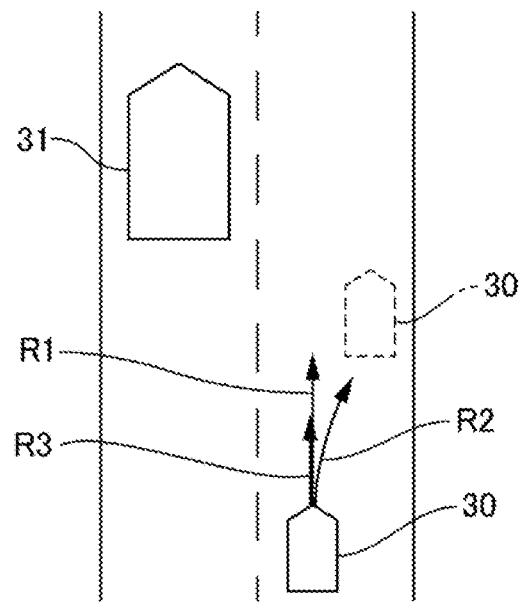
FIG. 8 illustrates a state in which a driver overrides autonomous driving to secure a safety margin to a preceding vehicle during an autonomous driving mode.

The road information determination portion 25 determines the non-normal running of the vehicle such as the emergency avoidance, when the road information comparison portion 24 determines R1≈R3, R1≠R2, and R2≠R3 in S112. When only R2 is different from the others, it is highly likely that the vehicle is not running along the road (or the guide route), and therefore the vehicle control apparatus can improve the accuracy of the road recognition even during the non-normal running. FIG. 8 illustrates a state in which the driver overrides the autonomous driving (intervenes in the steering) to secure a safety margin from a preceding vehicle during the autonomous driving mode. A subject vehicle 30 is running in a right lane, which is a straight road, in the autonomous driving mode. A large-size vehicle 31 is running in a left lane ahead in the straight road. The driver intervenes in the steering to move the subject vehicle 30 rightward within its own lane to secure the safety margin from the large-size vehicle 31, and the subject vehicle 30 is moved from a position indicated by a solid line to a position indicated by a broken line. At this time, if the road shape is recognized based on the assumption that the driver's operation is correct any time, i.e., the reliability of the second road shape R2 is high, the road shape would be incorrectly recognized as a rightward curve road despite the fact that this road is actually the straight road. On the other hand, according to the first embodiment, the vehicle control system can detect that the road shape is the straight road based on the first and third road shapes R1 and R3 by the majority vote of the comparison among the individual road shapes R1, R2, and R3. Therefore, the vehicle control system can improve the accuracy of the road recognition even when the driver overrides the autonomous driving during the autonomous driving mode.

The comparison information storage portion 26 stores the information (the latitude and the longitude, the advancing direction, the content of the failure, and the like) regarding the result of the comparison by the road information comparison portion 24 in association with the running location at which the road shapes are compared and the advancing direction of the vehicle (S115, S117, and S118). As a result, the vehicle control system can improve the accuracy of the road recognition when the subject vehicle runs next time or after that based on the experience of running this time. Further, the vehicle control system is configured to store minimum information, and therefore raises no problem even when using a memory having a relatively small storage capacity. In other words, the vehicle control system can reduce the occupied memory capacity.

The comparison information storage portion 26 stores the detection processing change content CC in S118, when the road information comparison portion 24 determines R1≈R2, R1≠R3, and R2≠R3 in S112. As a result, the vehicle control system can allow the system to recall the content of the previous incorrect recognition when the subject vehicle runs at the same running location in the autonomous driving mode again. Alternatively, when the previous stored content contains an error, the vehicle control system can correct this error. Therefore, the vehicle control system can improve the reliability of the autonomous driving.

The road information comparison portion 24 calculates the third road shape R3 based on the detection processing change content CC in S109, when the vehicle runs at the stored running location in the same direction as the stored advancing direction. As a result, the vehicle control system can allow the external world recognition system to function so as not to make the same error (incorrect recognition of the road shape by the external world recognition sensor and an inappropriate calculation of the road shape from the node location on the map) at the same location twice.

The road information comparison portion 24 changes the lane marker used as the reference based on the detection processing change content CC when calculating the third road shape R3 in S109. As a result, the vehicle control system can minimize the change in the processing content when calculating the third road shape R3, thereby minimizing an adverse effect accompanying the intended effects.

The comparison information storage portion 26 stores the corrected data (the corrected road shape Rc) in S117 and corrects the first road shape R1 into the corrected road shape Rc in S105, when the road information comparison portion 24 determines R1≠R2, R1≠R3, and R2≈R3 in S112. The vehicle control system can correct the first road shape R1 so as not to make the same error at the same location twice by correcting the map information (the first road shape R1 at the location where the failure has occurred). Further, the vehicle control system can reduce the occupied memory capacity because not having to directly rewrite the map database of the navigation system 2.

The road information comparison portion 24 compares the first road shape R1, the second road shape R2, and the third road shape R3 acquired in the same calculation cycle (50 ms). In other words, the road information comparison portion 24 compares R1, R2, and R3 at the time when the second road shape R2 is acquired. The vehicle control system can improve the precision of the comparison among the three pieces of information by matching up the times of the three pieces of information.

Figure 9A:
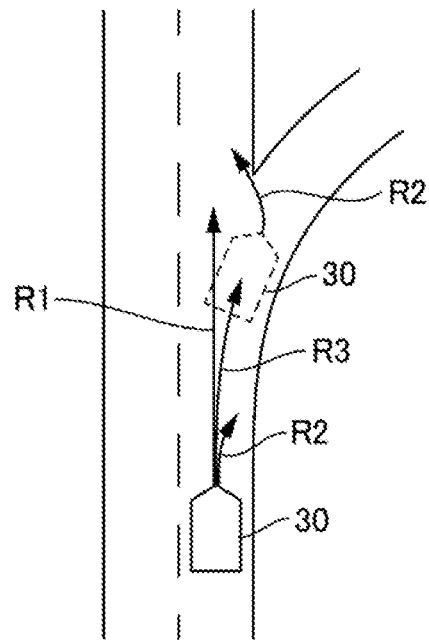
FIGS. 9A and 9B illustrate a state in which the driver overrides the autonomous driving to return a subject vehicle to a guide route during the autonomous driving mode and a state in which the subject vehicle runs at the same location again, respectively.
Figure 9B:
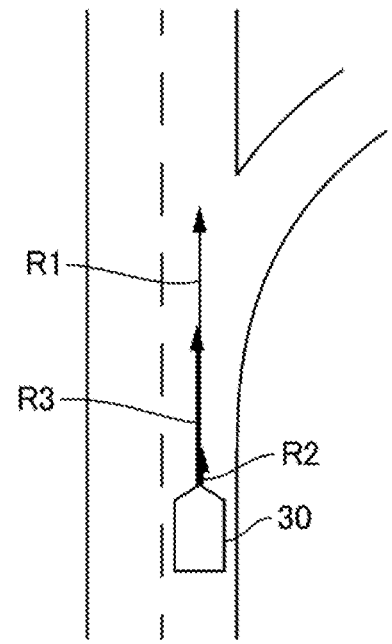

FIG. 9(a) illustrates a state in which the driver overrides the autonomous driving to return the subject vehicle to the guide route during the autonomous driving mode. The subject vehicle 30 is running in a right lane, which is the main road, in the autonomous driving mode. When the subject vehicle 30 reaches a Y-intersection, a lane marker to the left of the subject vehicle 30 is not recognized and only a lane marker on the right side is recognized in the traffic lane recognition based on the image processing, although the guide route is located on the left side (the main road side). In the autonomous driving mode, the steering is basically controlled based on the third road shape R3, and therefore the subject vehicle 30 is moved from a position indicated by a solid line to a position indicated by a broken line by being steered rightward. The driver correctively steers the subject vehicle 30 leftward to return the subject vehicle 30 to the main road side immediately. In this case, the road information determination portion 25 determines that the third road shape R3 is incorrect in S114, and sets a countermeasure (the detection processing change content CC) so as to ignore the lane marker on the branch road side in S114-2. The comparison information storage portion 26 stores the detection processing change content CC in S118. Then, when the subject vehicle 30 runs at the same location again, the road information determination portion 25 sets the curvature radius of the main road (the curvature radius of the lane marker on the left side) as the third road shape R3 in S109-4. Then, as illustrated in FIG. 9(b), the individual road shapes R1, R2, and R3 resemble one another, so that the subject vehicle 30 runs along the guide route.

In the above-described manner, the external world recognition control portion 5a functions so as to prevent recurrence of the incorrect recognition at the running location where the road shape has been incorrectly recognized. As a result, the vehicle control system can reduce the corrective steering by the driver during the autonomous driving mode, thereby increasing an operating time of the autonomous driving function. In other words, the vehicle control system can increase an automation rate (=an autonomous driving time/a running time×100%) [%].

Now, the following methods are known as a method for reducing the incorrect recognition of the road shape.
*Use a high-definition map, and constructs a running environment capable of eliminating an offset positional error.
*Enhance the sensing capability, i.e., make the sensing redundant with use of a plurality of different methods, thereby increasing the precision and the accuracy of the sensor itself.

However, using the high-definition map and enhancing the sensing capability are accompanied by a significant cost increase, and therefore are far from a realistic solution. On the other hand, according to the first embodiment, the recognition of the road shape based on the comparison among the three pieces of information and the storage of the result of the comparison can prevent the incorrect recognition of the road shape at the location where the subject vehicle has ever passed through with use of the existing road map and sensing while eliminating the necessity of the use of the high-definition map and the enhancement of the sensing capability.

Second Embodiment

Next, a second embodiment will be described. The second embodiment has a basic configuration similar to the first embodiment, and therefore will be described focusing on only differences therefrom.

Figure 10:
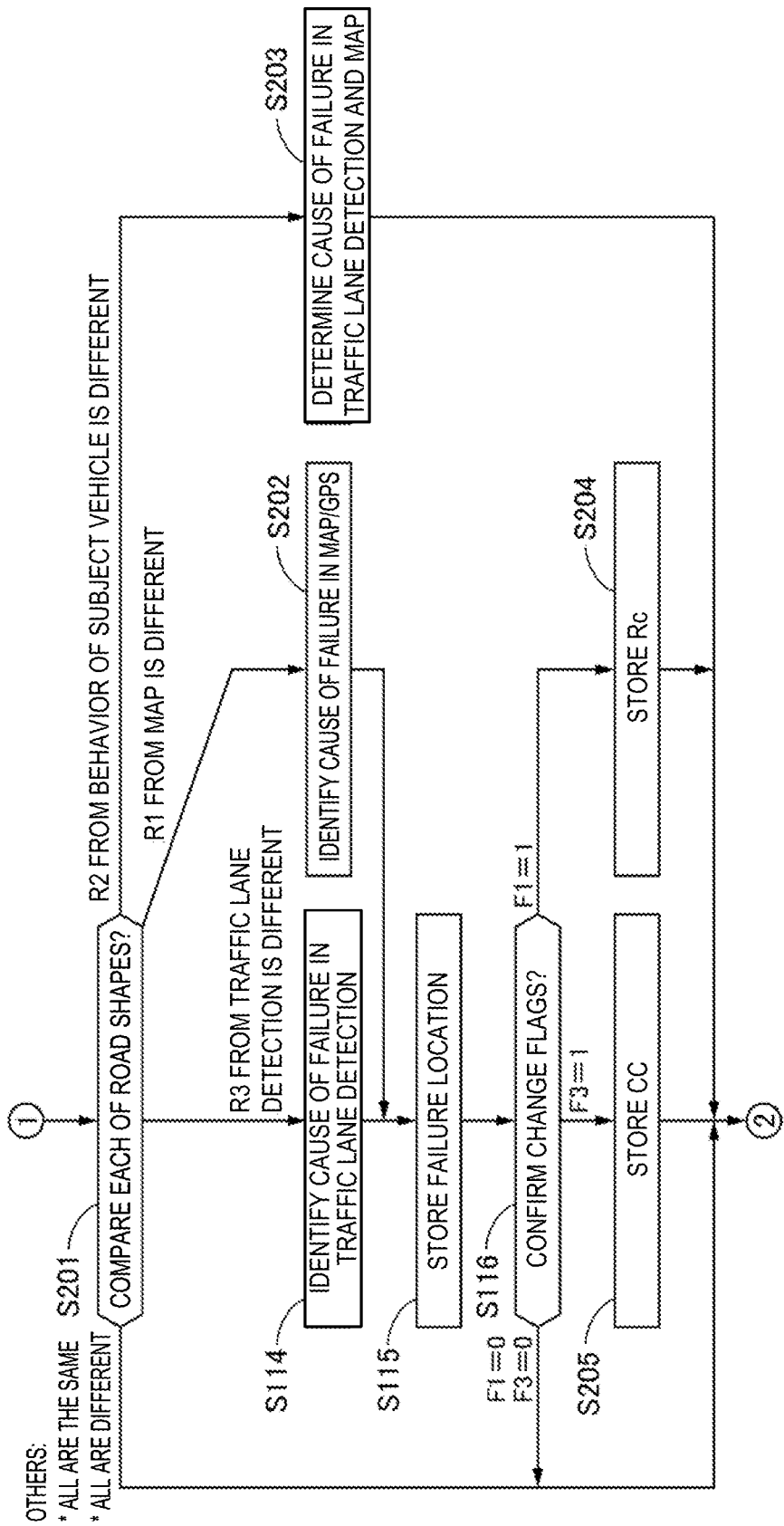
FIG. 10 is a flowchart illustrating a flow of control by the external world recognition control portion 5*a* according to the second embodiment.
Figure 11:
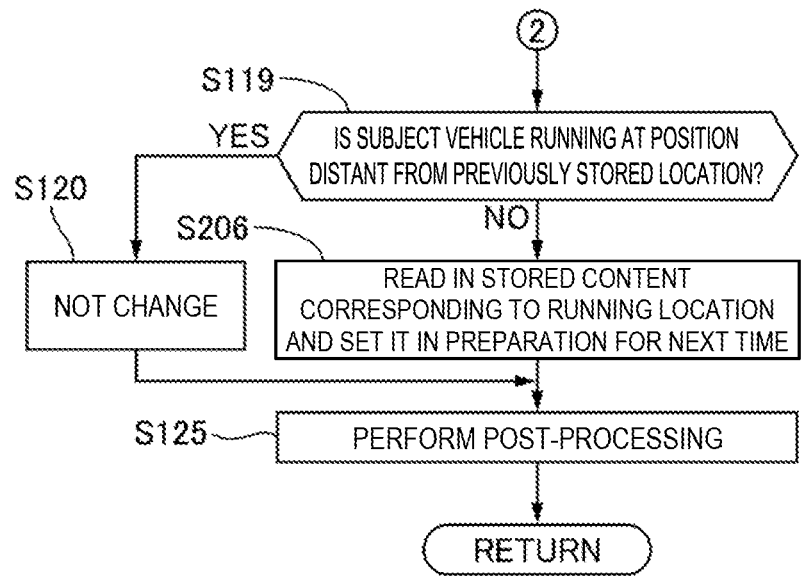
FIG. 11 is a flowchart illustrating the flow of the control by the external world recognition control portion 5*a* according to the second embodiment.

FIGS. 3, 10, and 11 are flowcharts illustrating a flow of control by the external world recognition control portion 5a according to the second embodiment. In FIGS. 10 and 11, steps in which similar processing to the steps illustrated in FIGS. 4 and 5 is performed will be identified by the same step numbers, and descriptions thereof will be omitted.

In S201, the road information comparison portion 24 compares each of the road shapes R1, R2, and R3, and the processing proceeds to the following step according to a result of the comparison (the road information comparison step). If the result of the comparison is R1≠R2, R1≠R3, and R2≈R3, i.e., R1 is different from R2 and R3, the processing proceeds to S202. If the result of the comparison is R1≈R2, R1≠R3, and R2≠R3, i.e., R3 is different from R1 and R2, the processing proceeds to S114. If the result of the comparison is R1≠R2, R1≈R3, and R2≠R3, i.e., R2 is different from R1 and R3, the processing proceeds to S203. Otherwise, i.e., if all of R1, R2, and R3 are the same as or different from one another, the processing proceeds to S119.

Figure 12:
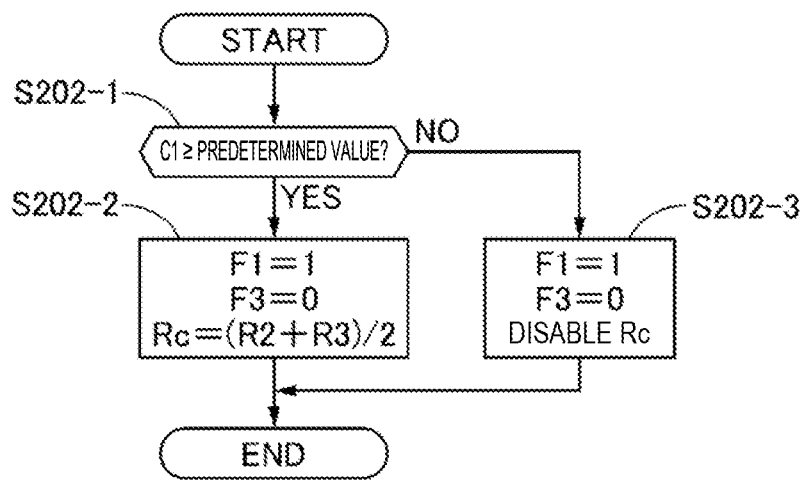
FIG. 12 is a flowchart illustrating a flow of processing in S202 in FIG. 10.

In S202, the road information determination portion 25 determines that the first road shape R1 based on the road map has low accuracy, i.e., an error is contained in the map information, and sets the corrected road shape Rc (the road information determination step). FIG. 12 illustrates a flow of the processing.

In S202-1, the road information determination portion 25 determines whether a map determination NG counter C1, which indicates the number of times that only the first road shape R1 is different, is equal to or larger than a predetermined value (for example, twice). If the determination in S202-1 is YES, the processing proceeds to S202-2. If the determination in S202-1 is NO, the processing proceeds to S202-3.

In S202-2, the road information determination portion 25 sets the map information change flag F1=1, the traffic lane detection change flag F3=0, and (R2+R3)/2 as the corrected road shape Rc.

In S202-3, the road information determination portion 25 sets the map information change flag F1=1 and the traffic lane detection change flag F3=0, and disables the corrected road shape Rc.

Figure 13:
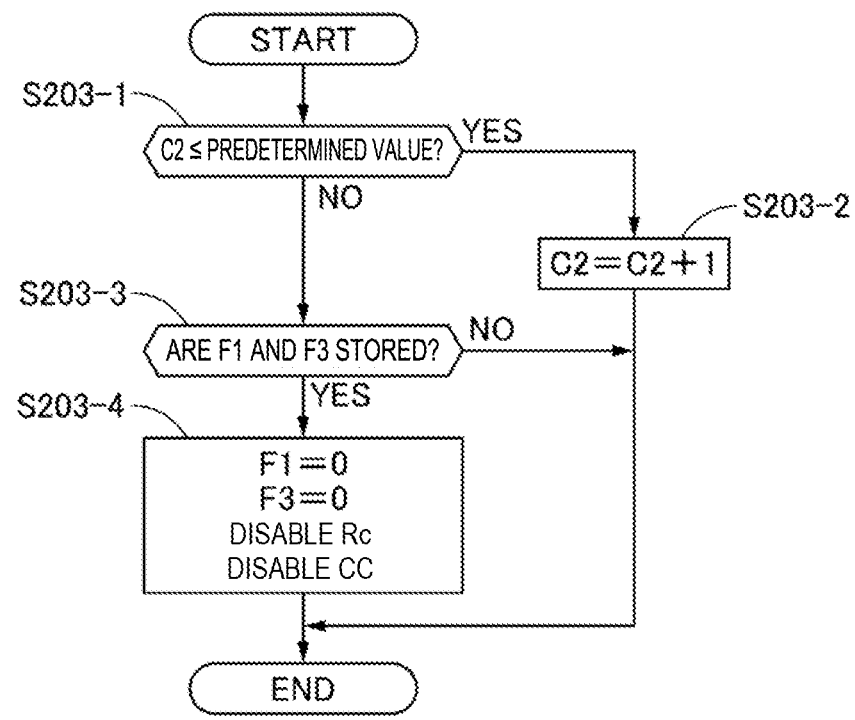
FIG. 13 is a flowchart illustrating a flow of processing in S203 in FIG. 10.

In S203, the road information determination portion 25 determines that the current running is the non-normal running, and determines whether the incorrect corrected road shape Rc and detection processing change content CC are stored with respect to the current running location (the road information determination step). FIG. 13 illustrates a flow of the processing.

In S203-1, the road information determination portion 25 determines whether an R2 mismatch number counter C2 (an initial value thereof is 0), which indicates the number of times that it is determined that only the second road shape R2 is different, is equal to or smaller than a predetermined value. If the determination in S203-1 is YES, the processing proceeds to S203-2. If the determination in S203-1 is NO, the processing proceeds to S203-3.

In S203-2, the road information determination portion 25 sets the R2 mismatch number counter C2=C2+1, and the present control is ended.

In S203-3, the road information determination portion 25 determines whether both the map information change flag F1 and the traffic lane detection change flag F3 are stored in the comparison information storage portion 26. If the determination in S203-3 is YES, the processing proceeds to S203-4. If the determination in S203-3 is NO, the present control is ended.

In S203-4, the road information determination portion 25 stores the map information change flag F1=0, the traffic lane detection change flag F3=0, the disablement of the corrected road shape Rc, and the disablement of the detection processing change content CC, and the present control is ended.

Figure 14:
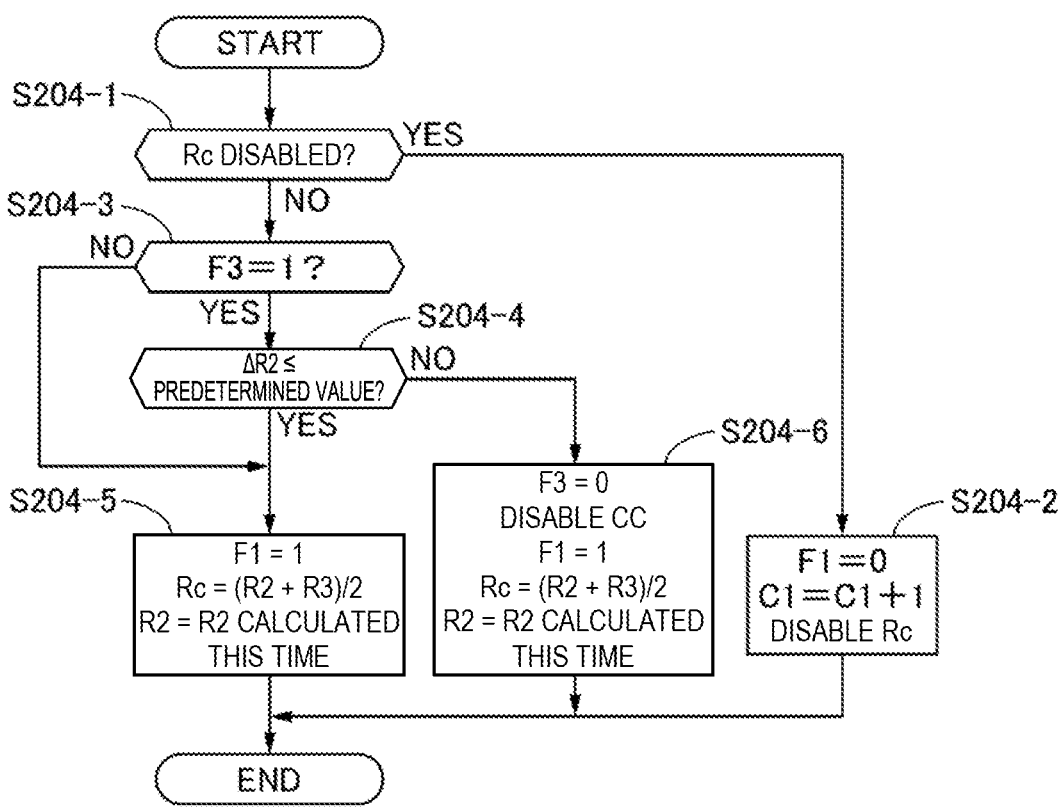
FIG. 14 is a flowchart illustrating a flow of processing in S204 in FIG. 10.

In S204, the external world recognition control portion 5a performs processing for storing the corrected road shape Rc and the like into the comparison information storage portion 26 (the comparison information storage step). FIG. 14 illustrates a flow of the processing.

In S204-1, the external world recognition control portion 5a determines whether the corrected road shape Rc is disabled. If the determination in S204-1 is YES, the processing proceeds to S204-2. If the determination in S204-1 is NO, the processing proceeds to S204-3.

In S204-2, the external world recognition control portion 5a stores the map information change flag F1=0, the map determination NG counter C1=C1+1, and the disablement of the corrected road shape Rc, and the present control is ended.

In S204-3, the external world recognition control portion 5a determines whether the stored traffic lane detection change flag F3 is F3=1. If the determination in S204-3 is YES, the processing proceeds to S204-4. If the determination in S204-3 is NO, the processing proceeds to S204-5.

In S204-4, the external world recognition control portion 5a determines whether a difference ΔR2 between the previously stored second road shape R2 and the second road shape R2 calculated by the second road information acquisition portion 22 this time is equal to or smaller than a predetermined value. If the determination in S204-4 is YES, the processing proceeds to S204-5. If the determination in S204-4 is NO, the processing proceeds to S204-6. The accuracy can be improved by increasing the number of times of the confirmation.

In S204-5, the external world recognition control portion 5a stores the map information change flag F1=1, the corrected road shape Rc=(R2+R3)/2, and R2=R2 calculated this time, and the present control is ended. In other words, the external world recognition control portion 5a determines that there is no problem with the stored content of the traffic lane detection at the current running location.

In S204-6, the external world recognition control portion 5a stores the traffic lane detection change flag F3=0, the disablement of the detection processing change content CC, the map information change flag F1=1, the corrected road shape Rc=(R2+R3)/2, and the second road shape R2=R2 calculated this time, and the present control is ended. In other words, the external world recognition control portion 5a determines that there is a problem with the stored content of the traffic lane detection at the current running location. As a result, the incorrect stored content can be corrected.

Figure 15:
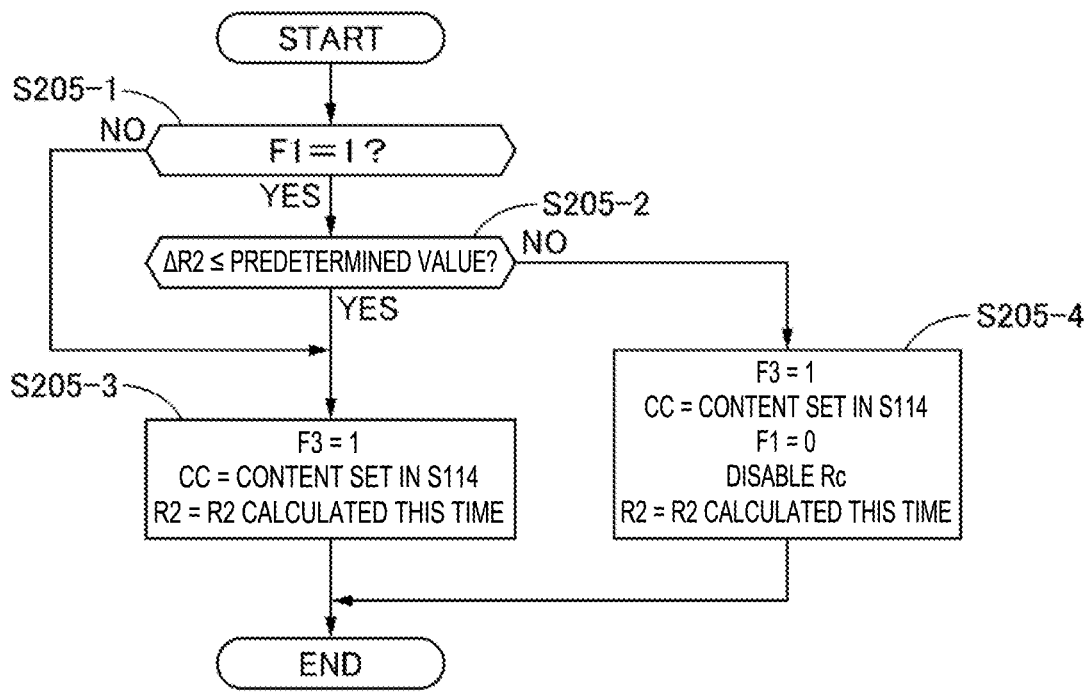
FIG. 15 is a flowchart illustrating a flow of processing in S205 in FIG. 10.

In S205, the external world recognition control portion 5a performs processing for storing the detection processing change content CC and the like into the comparison information storage portion 26 (the comparison information storage step). FIG. 15 illustrates a flow of the processing.

In S205-1, the external world recognition control portion 5a determines whether the road information change flag F1 is F1=1. If the determination in S205-1 is YES, the processing proceeds to S205-2. If the determination in S205-1 is NO, the processing proceeds to S205-3.

In S205-2, the external world recognition control portion 5a determines whether the difference ΔR2 between the previously stored second road shape R2 and the second road shape R2 calculated by the second road information acquisition portion 22 this time is equal to or smaller than the predetermined value. If the determination in S205-2 is YES, the processing proceeds to S205-3. If the determination in S205-2 is NO, the processing proceeds to S204-4.

In S205-3, the external world recognition control portion 5a stores the traffic lane detection change flag F3=1, the detection processing change content CC=the detection processing change content set in S114, and R2=R2 calculated this time, and the present control is ended. In other words, the external world recognition control portion 5a determines that there is no problem with the stored content of the map information at the current running location.

In S205-4, the external world recognition control portion 5a stores the traffic lane detection change flag F3=1, the detection processing change content CC=the detection processing change content set in S114, the map information change flag F1=0, the disablement of the corrected road shape Rc, and R2=R2 calculated this time, and the present control is ended. In other words, the external world recognition control portion 5a determines that there is a problem with the stored content of the map information at the current running location. As a result, the incorrect stored content can be corrected.

In S206, the road information determination portion 25 reads in the stored content close to the current running location and the advancing direction from the comparison information storage portion 26, and sets the map information change flag F1, the traffic lane detection change flag F3, the corrected road shape Rc, and the detection processing change content CC.

Next, advantageous effects of the second embodiment will be described.

In the second embodiment, when the map determination NG counter is C1≥the predetermined value in S202-1, i.e., only when the first road shape R1 is determined to be different from R2 and R3 at the same location a plurality of times, the vehicle control system sets the corrected road shape Rc for correcting R1 in S202-2, and stores the corrected road shape Rc in S204. In other words, the vehicle control system can improve the accuracy of the recognition of the road shape by handling the mismatch with care, such as changing the stored content of the map information only when the mismatch has occurred repeatedly at the same location. The vehicle control system can further improve the accuracy of the recognition of the road shape by dividing the map determination NG counter C1 into three stages, a high speed range, an intermediate speed range, and a low speed range, and counting the number of times for each vehicle speed range.

Further, according to the second embodiment, even when the incorrect recognition has occurred actually despite absence of a problem arising so as to cause the driver to feel strange, the vehicle control system can correct the incorrect recognition based on the running circumstance after that, thereby being able to achieve appropriate utilization of the autonomous driving function and increasing the automation rate as a result. For example, suppose that, when the subject vehicle reaches a gentle curve around a complicated intersection, the read shape from the guide route is such a shape that the road is perpendicularly bent rightward and then is perpendicularly bent leftward immediately after that. On the other hand, this road is detected as the gentle rightward curve along the actual road shape from the traffic lane detection based on the image processing. In the autonomous driving mode according to the present embodiment, the steering is basically controlled based on the traffic lane detection, so that the subject vehicle is controlled so as to follow the gentle rightward curve and the running is controlled so as to prevent the driver from feeling strange. The road information determination portion 25 sets the corrected road shape Rc for correcting the first road shape R1 in S202-2, when determining R1≠R2, R1≠R3, and R2≈R3 the plurality of number of times at the same location. The comparison information storage portion 26 stores the corrected road shape Rc in S204-5. Then, when the subject vehicle 30 runs at the same location again, the road information determination portion 25 sets the corrected road shape Rc as the road shape R1 in S105. As a result, the vehicle control system can handle even a circumstance that prohibits the traffic lane detection from sufficiently functioning due to bad weather or the like, thereby realizing further appropriate running control.

Third Embodiment

Next, a third embodiment will be described. The third embodiment has a basic configuration similar to the first embodiment, and therefore will be described focusing on only differences therefrom.

Figure 16:
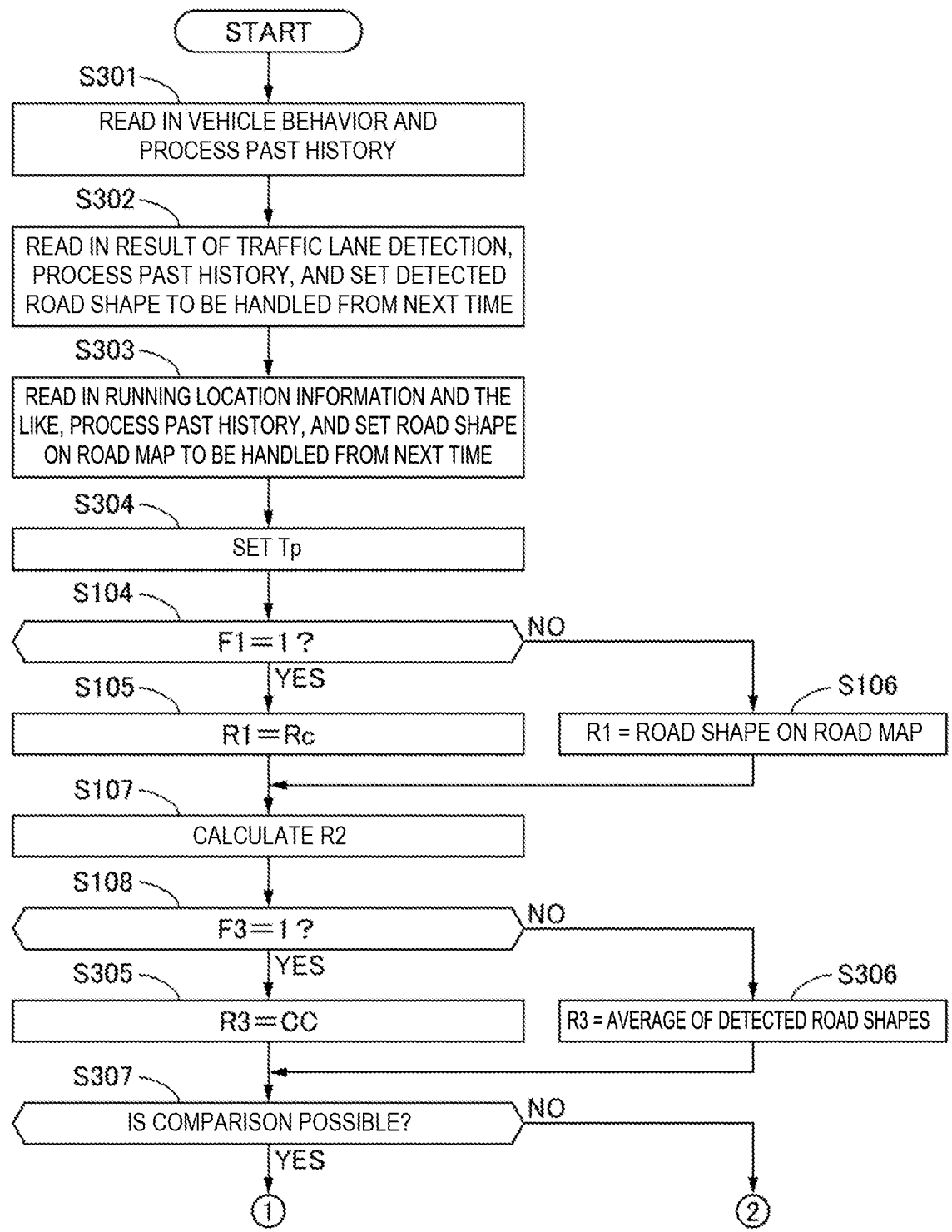
FIG. 16 is a flowchart illustrating the flow of the control by the external world recognition control portion 5*a* according to the third embodiment.
Figure 17:
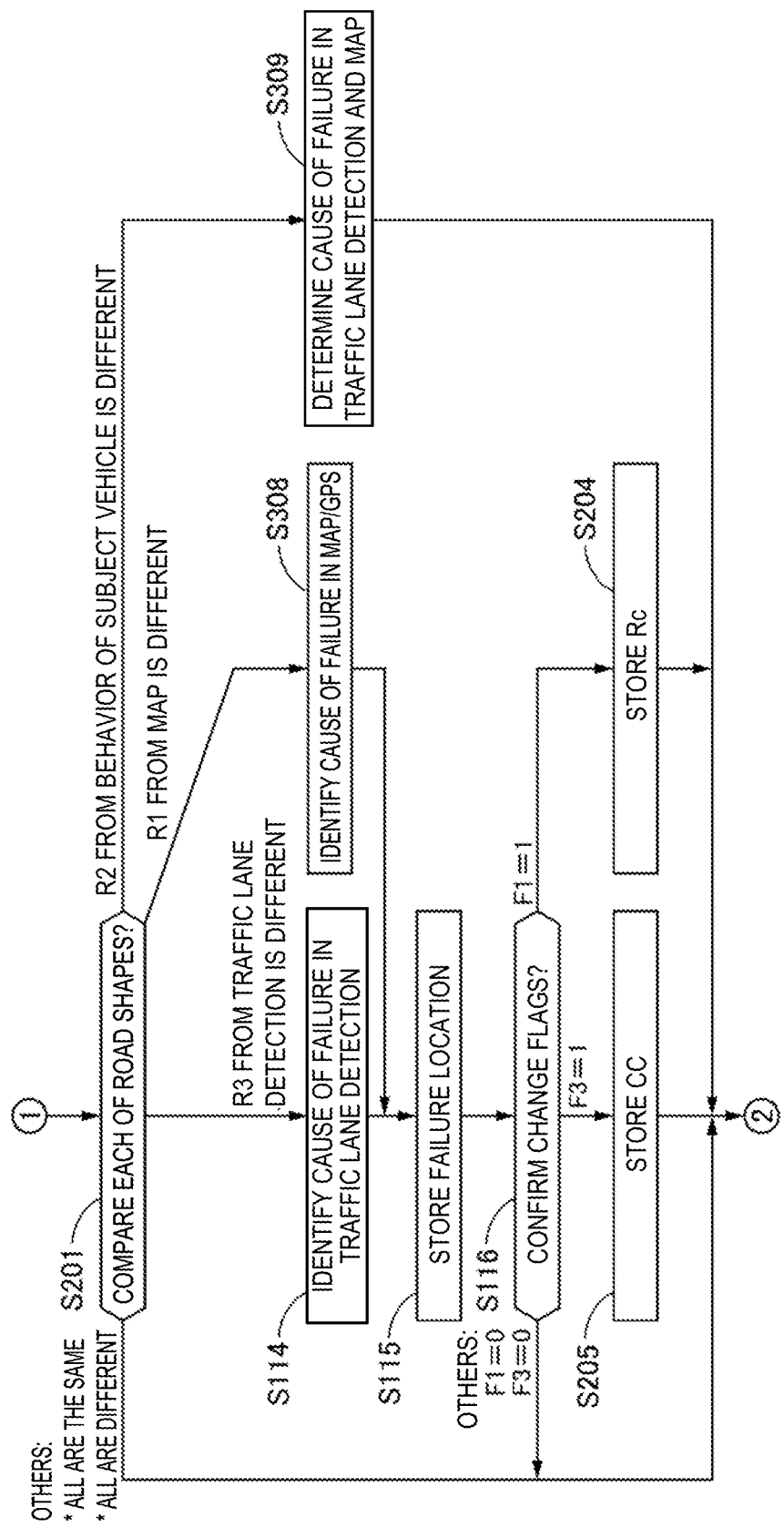
FIG. 17 is a flowchart illustrating the flow of the control by the external world recognition control portion 5*a* according to the third embodiment.

FIGS. 16, 17, and 5 are flowcharts illustrating a flow of control by the external world recognition control portion 5a according to the third embodiment. In FIGS. 16 and 17, steps in which similar processing to the steps illustrated in FIGS. 3, 4, 5, and 10 is performed will be identified by the same step numbers, and descriptions thereof will be omitted.

In S301, the external world recognition control portion 5a performs similar processing to S101 illustrated in FIG. 3, but also stores a previous history of each vehicle behavior for a predetermined period (the second road information acquisition step).

In S302, the external world recognition control portion 5a performs similar processing to S103 illustrated in FIG. 3, but also stores a previous history of the result of the traffic lane detection for a predetermined period. Then, the external world recognition control portion 5a retrospectively focuses on a past detection result earlier by a time acquired by subtracting a forward gazing time Tp from a time (for example, 25/12.5=2 seconds) calculated by dividing a distance to an intermediate location (25 m) of a distance range ahead of the subject vehicle (for example, suppose that this range is 5 m to 45 m ahead of the subject vehicle) into which an image processing range for detecting the traffic lane is converted by the vehicle speed V (for example, suppose that the vehicle speed V is 45 km/h=12.5 m/s), and treats it as a result of the traffic lane detection since then (the third road information acquisition step). The forward gazing time Tp will be described below.

Figure 18:
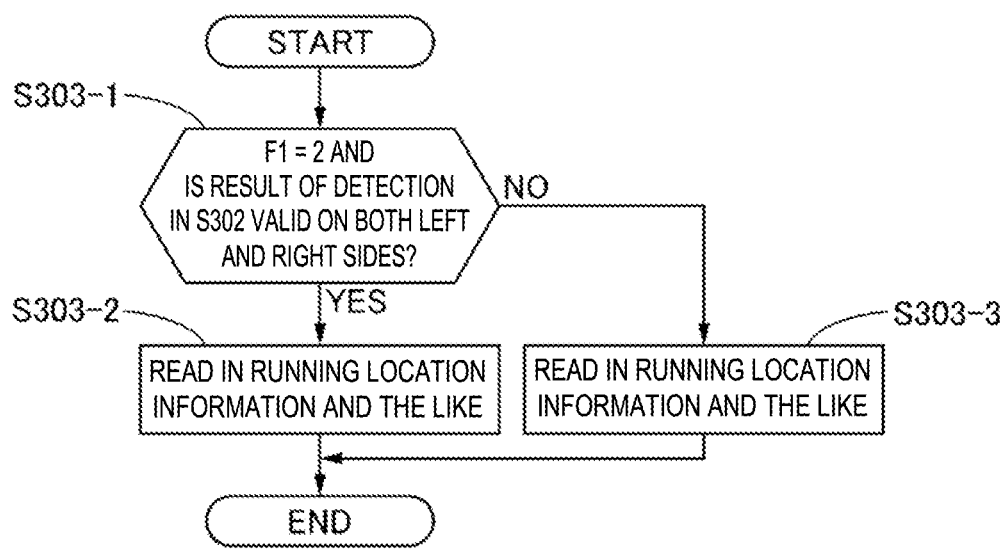
FIG. 18 is a flowchart illustrating a flow of processing in S303 in FIG. 16.

In S303, the first road information acquisition portion 21 reads in the running location information and the like based on the following condition regarding the map information change flag F1 (the first road information acquisition step). FIG. 18 illustrates a flow of the processing.

In S303-1, the first road information acquisition portion 21 determines whether the road information change flag F1 is F1=2 and the result of the detection in S302 is valid on both the left and right sides. If the determination in S303-1 is YES, the processing proceeds to S303-2. If the determination in S303-1 is NO, the processing proceeds to S303-3.

In S303-2, the first road information acquisition portion 21 performs similar processing to S102 illustrated in FIG. 3, but compares the road shape with the guide route on the road map to find out the most fitting location, corrects the current running location of the subject vehicle into a latitude and a longitude on the map that correspond to a location advanced by the forward gazing time Tp from a location returned from the most fitting location by a distance corresponding to the intermediate location (25 m), and also stores the previous history for a predetermined time. Then, the present control is ended.

In S303-3, the first road information acquisition portion 21 performs similar processing to S102 illustrated in FIG. 3, but acquires the running location information at a location ahead of the subject vehicle by a distance corresponding to the forward gazing time Tp, and also stores the previous history of the running location information for a predetermined time. Then, the present control is ended.

In S304, the road information comparison portion 24 estimates the forward gazing time Tp of the driver.

For example, in a case of a semi-autonomous driving system in which the driver operates the vehicle manually when, for example, turning right or left, the forward gazing time Tp is properly set with use of the following equation (8) only when the subject vehicle passes near a left-turn location based on the road map.

$$\text{if}(Tp > T\max\theta - \text{select\_later}(Tss, Tbs))(Tp = Tp - 0.1)\text{else} \quad (Tp = Tp + 0.1) \qquad (8)$$

In the equation (8), select_later(A1, A2) is a function of comparing A1 and A2 and selecting the one of them that starts at a later time, and the forward gazing time Tp is such a value that an initial value thereof is 1.5 seconds and a possible value thereof ranges from a minimum value 1.0 second to a maximum value 2.0 seconds. Further, Tmaxθ, Tss, and Tbs represent a maximum steering angle time, a steering start time, and a deceleration start time, respectively. The maximum steering angle time Tmaxθ is a time at which the largest steering angle θ is generated when the subject vehicle is turning left. The steering start time Tss is a time at which the subject vehicle starts to be steered when turning left. The deceleration start time Tbs is a time at which the subject vehicle starts to be slowed down to turn left. Alternatively, simply, an inter-vehicle time (Time Headway) used in control of an inter-vehicle distance to the preceding vehicle may be set as Tp.

In S305 and S306, the external world recognition control portion 5a performs similar processing to S109 and S110 illustrated in FIG. 3. However, while R3 used when the target turning angle is calculated is the same as R3 used in the comparison with the R1 and R2 in the first and second embodiments, the third embodiment is different from the first and second embodiments in terms of use of R3' based on the road shape acquired from the latest result of the detection for the calculation of the target turning angle. As a result, the vehicle control system can prevent a reduction in the control performance of the autonomous driving, thereby improving the precision of the comparison among the three pieces of information.

In S307, the external world recognition control portion 5a performs similar processing to S111 illustrated in FIG. 3, but determines whether each of the road shapes R1, R2, and R3 can be compared with one another further strictly by also additionally applying the following condition.

*The subject vehicle is in such a state that changes in the vehicle speed V and the steering angle δ are equal to or smaller than predetermined changes (to exclude a running state such as the emergency avoidance, in which the precision of the comparison reduces).

*A feature amount as the lane marker in the camera image is equal to or greater than a predetermined amount (to avoid the comparison in a state where the detection accuracy of the traffic lane detection reduces).

Figure 19:
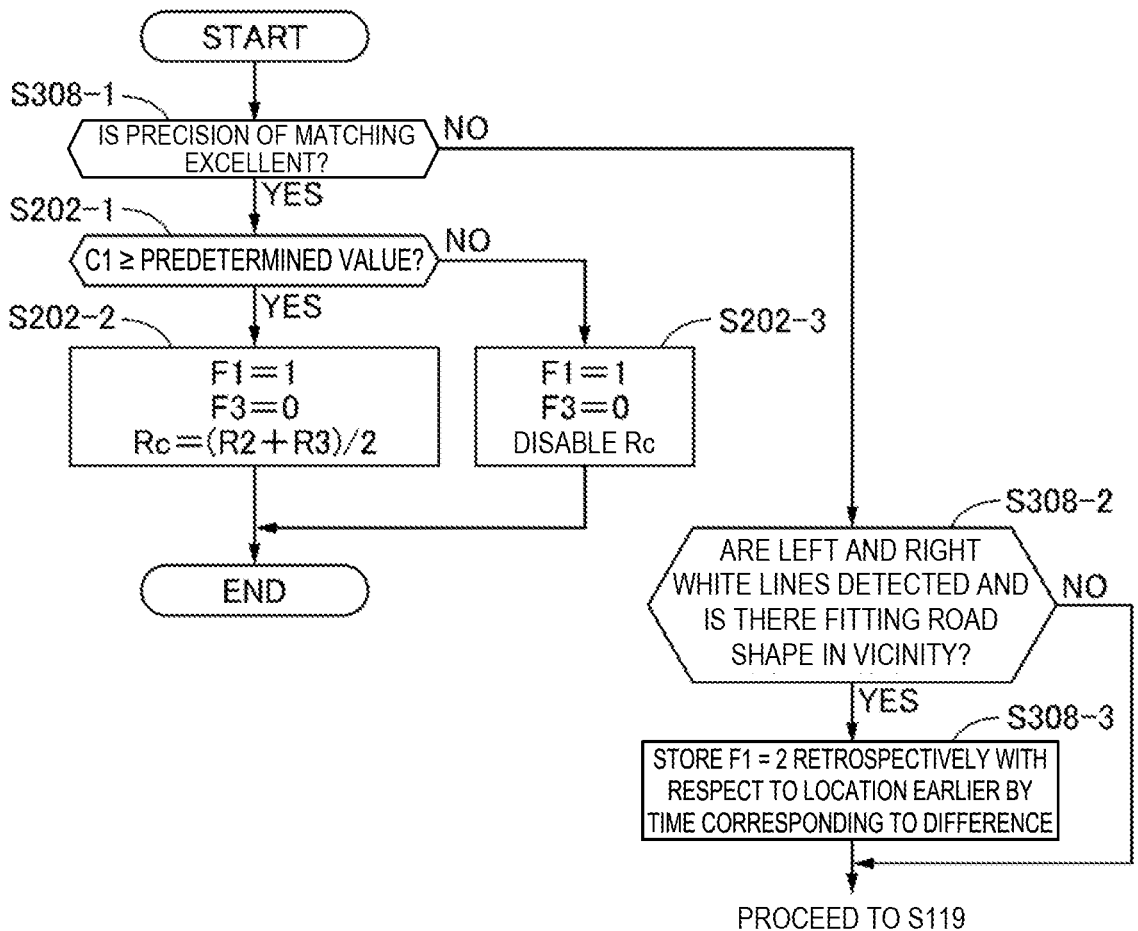
FIG. 19 is a flowchart illustrating a flow of processing in S308 in FIG. 17.

In S308, the external world recognition control portion 5a performs similar processing to S202 illustrated in FIG. 10, but also takes into consideration a possible circumstance that would lead to low precision of the matching between the GPS1 and the map information (the road information determination step). FIG. 19 illustrates a flow of the processing. Steps in which similar processing to the steps illustrated in FIG. 12 is performed will be identified by the same step numbers, and descriptions thereof will be omitted.

In S308-1, the external world recognition control portion 5a determines whether the precision of the matching between the GPS 1 and the map information is excellent or not (high or low). If the determination in S308-1 is YES, the processing proceeds to S202-1. If the determination in S308-1 is NO, the processing proceeds to S308-2. For example, the matching precision is determined to be low in such a circumstance that the number of caught GPS satellites is only a predetermined number or less.

In S308-2, the external world recognition control portion 5a determines whether both left and right white lines are detected and there is a road shape on the road map that fits to the shape of the white lines near the position of the subject vehicle. If the determination in S308-2 is YES, the processing proceeds to S308-3. If the determination in S308-2 is NO, the processing proceeds to S119.

In S308-3, the external world recognition control portion 5a stores the map information change flag F1=2 retrospectively with respect to a past location earlier by a time corresponding to a difference between the fitting position and the position of the subject vehicle on the road map. Then, the processing proceeds to S119.

Figure 20:
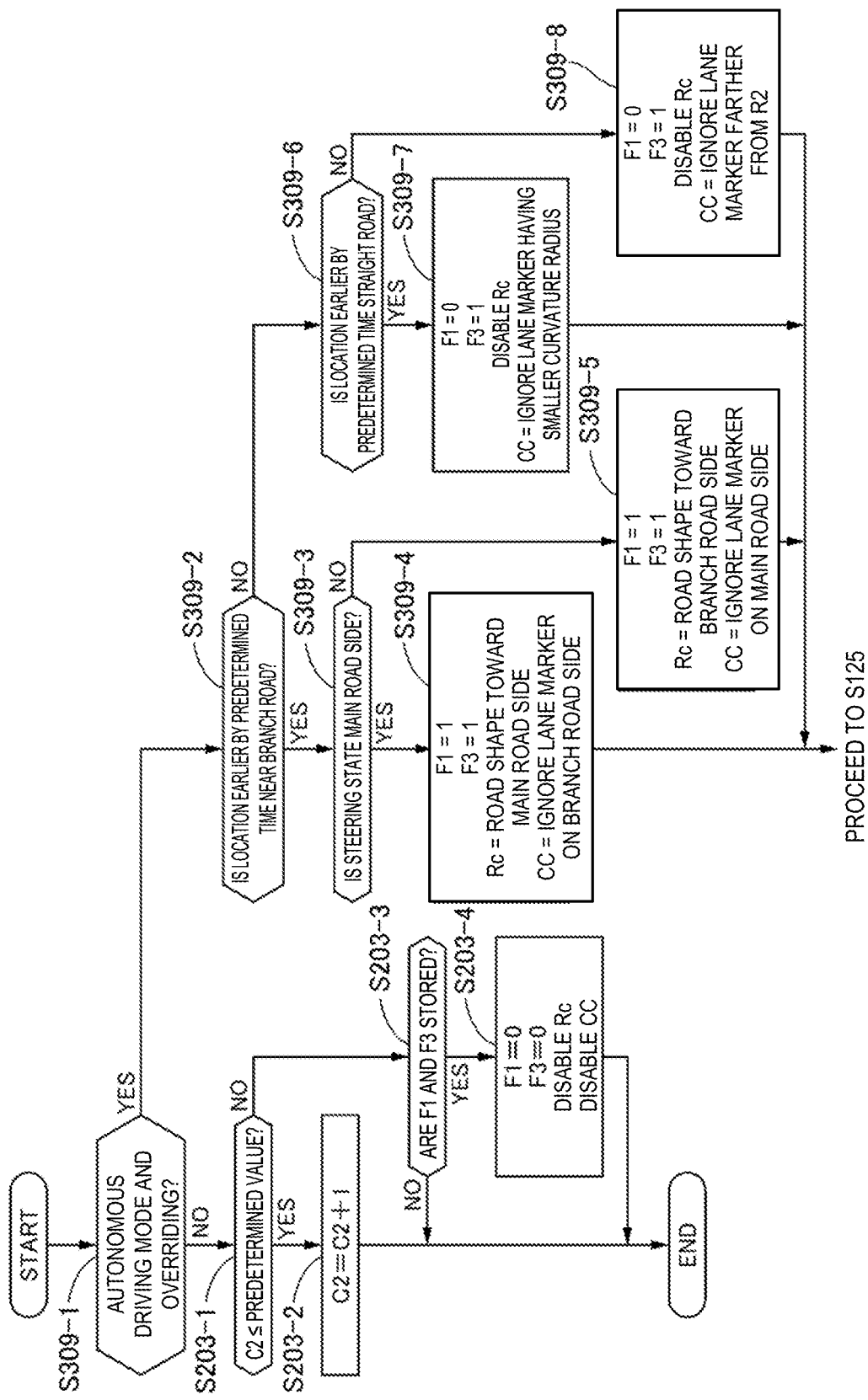
FIG. 20 is a flowchart illustrating a flow of processing in S309 in FIG. 17.

In S309, the external world recognition control portion 5a performs similar processing to S203 illustrated in FIG. 10, but also takes into consideration a possible circumstance under which the driver would override the autonomous driving during the autonomous driving (the road information determination step). FIG. 20 illustrates a flow of the processing. Steps in which similar processing to the steps illustrated in FIG. 13 is performed will be identified by the same step numbers, and descriptions thereof will be omitted.

In S309-1, the external world recognition control portion 5a determines whether the driving mode is the autonomous driving mode, and the driver is overriding the autonomous driving. If the determination in S309-1 is YES, the processing proceeds to S309-2. If the determination in S309-1 is NO, the processing proceeds to S203-1.

In S309-2, the external world recognition control portion 5a retrospectively determines whether a past location earlier than the current position by a predetermined time (for example, 3 seconds) is near a branch road. If the determination in S309-2 is YES, the processing proceeds to S309-3. If the determination in S309-2 is NO, the processing proceeds to S309-6.

In S309-3, the external world recognition control portion 5a determines whether the driver's steering state indicates the main road side. If the determination in S309-3 is YES, the processing proceeds to S309-4. If the determination in S309-3 is NO, the processing proceeds to S309-5.

In S309-4, since the driver's steering state indicates the main road side, the external world recognition control portion 5a stores the map information change flag F1=1, the traffic lane detection change flag F3=1, the corrected road shape Rc "the road shape at the same location toward the main road side on the road map", and the detection processing content CC "ignore the lane marker on the branch road side when running in the traffic lane on the branch road side" retrospectively with respect to a past location earlier than the branch location on the road map by a time corresponding to the intermediate location. Then, the processing proceeds to S125.

In S309-5, since the driver's steering state indicates the branch road side, the external world recognition control portion 5a stores the map information change flag F1=1, the traffic lane detection change flag F3=3, the corrected road shape Rc "the road shape at the same location toward the branch road side on the road map", and the detection processing content CC "ignore the lane marker on the main road side when running in the traffic lane on the branch road side" retrospectively with respect to the past location earlier than the branch location on the road map by the time corresponding to the intermediate location. Then, the processing proceeds to S125.

In S309-6, the external world recognition control portion 5a retrospectively determines whether the past location earlier than the current location by the predetermined time (for example, 3 seconds) is a straight road. If the determination in S309-6 is YES, the processing proceeds to S309-7. If the determination in S309-6 is NO, the processing proceeds to S309-8.

In S309-7, since the road map indicates one straight road and this means that the CMOS camera outputs incorrect detection, the external world recognition control portion 5a stores the map information change flag F1=0, the traffic lane detection change flag F3=1, the disablement of the corrected road shape Rc, and the detection processing content CC "ignore the one of the left and right lane markers that has a smaller curvature radius" retrospectively with respect to a past location earlier than the current location by the time corresponding to the intermediate location. Then, the processing proceeds to S125.

In S309-8, since the road map indicates one curve road and this means that the CMOS camera outputs incorrect detection, the external world recognition control portion 5a stores the map information change flag F1=0, the traffic lane detection change flag F3=1, the disablement of the corrected road shape Rc, and the detection processing change content CC "ignore the one of the left and right lane markers that has a curvature radius farther from R2" retrospectively with respect to the past location earlier than the current location by the time corresponding to the intermediate location. Then, the processing proceeds to S125.

Next, advantageous effects of the third embodiment will be described.

The road information comparison portion 24 sets the forward gazing time Tp according to the driver's driving characteristics (a steering response and a deceleration response) during the manual driving mode with use of the equation (8) in S304. The road information comparison portion 24 compares the second road shape R2 acquired at the predetermined time, and the first and third road shapes R1 and R3 at the location that the subject vehicle reaches after the forward gazing time Tp since the predetermined time in S201. Normally, the driver controls the vehicle according to the road shape at the location that the vehicle reaches after the forward gazing time Tp. Therefore, the vehicle control system can improve the precision of the comparison by matching up the comparison among the three pieces of information with the forward gazing time Tp. Further, the vehicle control system can absorb a variation in the driver's driving characteristics by properly setting the forward gazing time Tp according to the driver's driving characteristics, thereby further improving the precision of the comparison among the three pieces of information.

The comparison information storage portion 26 stores the map information change flag F1=2 retrospectively with respect to the past location earlier by the time corresponding to the difference between the fitting position and the position of the subject vehicle on the road map in S308-3 when the precision of the matching between the GPS 1 and the map information is not excellent in S308-1, when the road information comparison portion 24 determines R1≠R2, R1≠R3, and R2≈R3 in S201. When the map information change flag F1 is F1=2 in S303-1, the first road information acquisition portion 21 finds out the most fitting location in S303-2, and corrects the current running location of the subject vehicle into the latitude and longitude on the map that correspond to the location reached by moving forward by the time corresponding to the forward gazing time Tp from the location reached by moving back from the most fitting location by the distance corresponding to the intermediate location. In other words, the vehicle control system can improve the precision of the comparison among the three pieces of information by correcting the matching, when the matching between the position of the subject vehicle and the map is dubious.

The road information comparison portion 24 sets the corrected road shape Rc and the detection processing change content CC retrospectively to the past location earlier than the branch location on the road map by the time corresponding to the intermediate location in S309-4 or S309-5, when the driver overrides the autonomous driving during the autonomous driving in S309-1 and the past location earlier than the current running location by the predetermined time is positioned near the branch road in S309-2. Then, the road information comparison portion 24 sets the corrected road shape Rc as the first road shape R1 in S105 and calculates the third road shape R3 based on the detection processing change content CC in S305 in the next calculation cycle. In other words, when the driver overrides the autonomous driving during the autonomous driving and there is a branch or a junction near the running location, the road information comparison portion 24 compares the three pieces of information again while retrospectively focusing on the earlier past location than during the normal running (during the manual driving mode or absence of a branch or a junction) as the time treated as the first road shape R1 and the second road shape R2. While the driver steers the vehicle along the road shape during the manual driving mode, the driver starts to override the autonomous driving (correctively steers the vehicle) during the autonomous driving mode after some time has elapsed since the vehicle starts the behavior deviating from the guide route. Therefore, the vehicle control system can improve the precision of the comparison among the three pieces of information, by taking into consideration a delay in the driver's response and retrospectively focusing on the past earlier than during the manual driving mode, thereby reflecting the delay into the recognition of the road shape during the autonomous driving mode. In FIG. 9(a), the first road shape R1 is determined to be incorrect first. After that, because of presence of a possibility that the third road shape R3 may be incorrect according to the determination of "override" and "the presence of a branch road", both the first road shape R1 and the second road shape R2 are determined to have been straight roads retrospectively. Therefore, the third road shape R3 is calculated based on the curvature radius of the lane marker on the left side from the next time.

Other Embodiments

Having described the embodiments for implementing the present invention, the specific configuration of the present invention is not limited to the configurations of the embodiments, and the present invention also includes a design modification and the like thereof made within a range that does not depart from the spirit of the present invention. Further, the individual components described in the claims and the specification can be arbitrarily combined or omitted within a range that allows them to remain capable of achieving at least a part of the above-described objects or producing at least a part of the above-described advantageous effects.

In the embodiments, the vehicle control system has been described referring to the example that compares the curvature radii as the comparison among the pieces of road information (the road shapes), but may use a slope as the road information. In this case, the vehicle control system calculates the first road shape from an altitude, calculates the second road shape from an accelerator and a brake, calculates the third road shape from the height or the slope of the road surface, and compares the three road shapes. Due to this configuration, the vehicle control system can enhance the performance of the automation regarding the longitudinal direction of the vehicle. The curvature radius and the slope may be used in combination as the road shape.

In the embodiments, the vehicle control system has been described referring to the example that changes how the result of the traffic lane detection is used, but may change the image recognition in the traffic lane detection processing. More specifically, the vehicle control system changes a processing content of object recognition or slope recognition by the external world recognition sensor when the subject vehicle runs again at the location where the third road shape has been determined to be different from the first and second road shapes. As a result, the vehicle control system can minimize the change in the processing content of the external world recognition, thereby minimizing the adverse effect accompanying the intended effects. More specifically, in S109-4, S109-5, S109-7, and S109-8, eq1/eq2 in if (condition) {eq1}else{eq2} is changed in the following manner.

*If R3=R_L is satisfied, select the one resembling the shape that is the result of the recognition of the lane marker on the left side from candidates for the lane marker on the right side.

*If R3=R_R is satisfied, select the one resembling the shape that is the result of the recognition of the lane marker on the right side from candidates for the lane marker on the left side.

From this configuration, the recognition performance of the traffic lane detection processing can also be improved.

Next, a method for determining whether the constituent features (the technical scope) of the present invention are satisfied based on the vehicle behavior will be described (this method can also be restated as a method for discovering infringement of the right of the present invention).

(1) Prepare a vehicle deemed to satisfy the constituent features (the technical scope) of the present invention (infringe the right). This vehicle is a vehicle equipped with the navigation system, the vehicle behavior detector, and the external world recognition sensor, and at least capable of aiding the driving by the autonomous steering.

(2) Prepare a test course on which the above-described vehicle has never run. The test course is constructed as a closed environment by removing a vehicle or the like around the prepared vehicle to eliminate an influence on the external world recognition sensor. The test course contains a Y-intersection (a main road and a branch road) like the example illustrated in FIG. 9.

(3) Cover a GPS antenna of the vehicle with a metallic cover to prohibit it from receiving a GPS signal.

(4) Drive the vehicle on the test course in this state, and cause a malfunction (running toward the branch road side) due to incorrect recognition toward outside the course by the lane recognition sensor immediately before the Y-intersection.

(5) A driver immediately overrides the autonomous driving (correctively steers the vehicle so as to return the vehicle to the main road side).

(6) Repeat (4) to (5) approximately ten times, and confirm frequency of the incorrect recognition.

(7) Remove the cover of the GPS antenna, and repeat (4) to (5) approximately ten times.

If the incorrect recognition has occurred a plurality of times as the frequency in (6) but the incorrect recognition in (7) has occurred only at the first try once, it is apparent that this vehicle achieves the comparison among the three pieces of information by the majority vote, the storage of the incorrect recognition, and the prevention of the recurrence, and therefore this vehicle can be determined to satisfy the constitute features of the present invention.

In the following description, other configurations recognizable from the above-described embodiments will be described.

A vehicle control apparatus, according to one configuration thereof, includes a first road information acquisition portion configured to acquire first road information based on information regarding a map, a second road information acquisition portion configured to acquire second road information based on a vehicle behavior, a third road information acquisition portion configured to acquire third road information based on information recognized by an external world recognition sensor, a road information comparison portion configured to compare the first road information, the second road information, and the third road information acquired from the first, second, and third road information acquisition portions, respectively, and a road information determination portion configured to determine accuracy of each of the first road information, the second road information, and the third road information based on a result of the comparison by the road information comparison portion.

According to a further preferable configuration, in the above-described configuration, the road information determination portion determines that an incorrect recognition by the external world recognition sensor has occurred, if the road information comparison portion determines that the first road information and the second road information match or resemble each other and the third road information is different from the first road information and the second road information.

According to another preferable configuration, in any of the above-described configurations, the road information determination portion determines that an error is contained in the information regarding the map, if the road information comparison portion determines that the second road information and the third road information match or resemble each other and the first road information is different from the second road information and the third road information.

According to further another preferable configuration, in any of the above-described configurations, the road information determination portion determines that a vehicle is running in a non-normal manner, if the road information comparison portion determines that the first road information and the third road information match or resemble each other and the second road information is different from the first road information and the third road information.

According to further another preferable configuration, any of the above-described configurations further includes a comparison information storage portion configured to store information regarding the result of the comparison by the road information comparison portion in association with a location at which the road information is compared and an advancing direction of a vehicle.

According to further another preferable configuration, in any of the above-described configurations, the comparison information storage portion stores a method for changing the recognition by the external world recognition sensor in association with the location at which the road information is compared, if the road information comparison portion determines that the first road information and the second road information match or resemble each other and the third road information is different from the first road information and the second road information.

According to further another preferable configuration, in any of the above-described configurations, the road information comparison portion changes recognition processing by the external world recognition sensor when the vehicle runs again in the same direction as the advancing direction stored in association with the location at which the road information is compared.

According to further another preferable configuration, in any of the above-described configurations, the road information comparison portion changes a processing content of traffic lane recognition processing by the external world recognition sensor, when the vehicle runs again at a location determined by the road information comparison portion to have a shape varying in a lateral direction with respect to the advancing direction of the vehicle based on the difference between the third road information, and the first road information and the second road information.

According to further another preferable configuration, in any of the above-described configurations, the road information comparison portion changes a processing content of object recognition or slope recognition by the external world recognition sensor, when the vehicle runs again at a location determined by the road information comparison portion to have a shape varying in a longitudinal direction with respect to the advancing direction of the vehicle based on the difference between the third road information, and the first road information and the second road information.

According to further another preferable configuration, in any of the above-described configurations, the comparison information storage portion stores information contained in the map after correcting it in correspondence with the location at which the road information is compared, if the road information comparison portion determines that the second road information and the third road information match or resemble each other and the first road information is different from the second road information and the third road information.

According to further another preferable configuration, in any of the above-described configurations, the comparison information storage portion stores information regarding matching between a position of the vehicle and the map after correcting it in correspondence with the location at which the road information is compared, if the road information comparison portion determines that the second road information and the third road information match or resemble each other and the first road information is different from the second road information and the third road information.

According to further another preferable configuration, in any of the above-described configurations, the comparison information storage portion stores the information regarding the map after correcting it in correspondence with the location at which the road information is compared, if the road information comparison portion determines a plurality of times that the first road information and the third road information match or resemble each other and the second road information is different from the first road information and the third road information.

According to further another preferable configuration, in any of the above-described configurations, locations at which the first road information, the second road information, and the third road information are acquired, respectively, match one another.

According to further another preferable configuration, in any of the above-described configurations, the road information comparison portion compares the first road information, the second road information, and the third road information at a time when the second road information is acquired.

According to further another preferable configuration, in any of the above-described configurations, the road information comparison portion sets a forward gazing time according to a driving characteristic of a driver, and compares the second road information acquired at a predetermined time, and the first road information and the third road information at a location that a vehicle reaches when the forward gazing time has elapsed since the predetermined time.

According to further another preferable configuration, in any of the above-described configurations, the second road information acquisition portion holds the acquired second road information for a predetermined time. The road information comparison portion compares the first road information, the second road information, and the third road information again while retrospectively focusing on a past earlier than during normal running as a time at which the first road information should be acquired, if the driver intervenes in steering during autonomous driving of a vehicle and there is a branch, a junction, or the like near a running location.

According to further another preferable configuration, in any of the above-described configurations, the second road information acquisition portion changes a time at which the second road information is acquired according to whether a vehicle is under autonomous driving.

Further, from another aspect, a vehicle control apparatus includes a first road information acquisition portion configured to acquire first road information based on information regarding a map, a second road information acquisition portion configured to acquire second road information based on a vehicle behavior, a third road information acquisition portion configured to acquire third road information based on information recognized by an external world recognition sensor, a road information comparison portion configured to compare the first road information, the second road information, and the third road information acquired from the first, second, and third road information acquisition portions, respectively, a road information determination portion configured to determine accuracy of each of the first road information, the second road information, and the third road information by a majority vote based on a result of the comparison by the road information comparison portion, a comparison information storage portion configured to store a result of the determination by the road information determination portion in association with a location at which the road information is compared and an advancing direction of a vehicle, and an autonomous driving control portion configured to autonomously drive the vehicle based on road information determined to be highly accurate when the vehicle has run last time among the first road information, the second road information, and the third road information stored in the comparison information storage portion, when the vehicle runs the location stored in the comparison information storage portion again.

Further, from another aspect, a vehicle control method includes acquiring first road information based on information regarding a map, acquiring second road information based on a vehicle behavior, acquiring third road information based on information recognized by an external world recognition sensor, comparing the acquired first road information, second road information, and third road information, and determining accuracy of each of the first road information, the second road information, and the third road information based on a result of the comparison by the comparing the road information.

Preferably, the above-described configuration further includes storing information regarding the result of the comparison by the comparing the road information in association with a location at which the road information is compared and an advancing direction of a vehicle.

Further, from another aspect, a vehicle control system includes a navigation system configured to display information regarding a map, a vehicle behavior detector configured to detect a vehicle behavior, an external world recognition sensor configured to recognize information about an external world, and a control unit. The control unit includes a first road information acquisition portion configured to acquire first road information based on the navigation system, a second road information acquisition portion configured to acquire second road information based on the vehicle behavior detector, a third road information acquisition portion configured to acquire third road information based on the external world recognition sensor, a road information comparison portion configured to compare the first road information, the second road information, and the third road information acquired from the first, second, and third road information acquisition portions, respectively, and a road information determination portion configured to determine accuracy of each of the first road information, the second road information, and the third road information based on a result of the comparison by the road information comparison portion.

Preferably, in the above-described configuration, the control unit further includes a comparison information storage portion configured to store information regarding the result of the comparison by the road information comparison portion in association with a location at which the road information is compared and an advancing direction of a vehicle.

The present application claims priority under the Paris Convention to Japanese Patent Application No. 2017-94355 filed on May 11, 2017. The entire disclosure of Japanese Patent Application No. 2017-94355 filed on May 11, 2017 including the specification, the claims, the drawings, and the abstract is incorporated herein by reference in its entirety.

REFERENCE SIGNS LIST 2 navigation system
3 vehicle behavior detector
4 camera unit (external world recognition sensor)
5 control unit
21 first road information acquisition portion
22 second road information acquisition portion
21 third road information acquisition portion
24 road information comparison portion
25 road information determination portion
26 comparison information storage portion

The invention claimed is:
1. A vehicle control apparatus comprising:
   a first road information acquisition portion configured to acquire first road information based on information regarding a map;

a second road information acquisition portion configured to acquire second road information based on a vehicle behavior;

a third road information acquisition portion configured to acquire third road information based on information recognized by an external world recognition sensor;

a road information comparison portion configured to compare the first road information, the second road information, and the third road information acquired from the first, second, and third road information acquisition portions, respectively;

a road information determination portion configured to determine accuracy of each of the first road information, the second road information, and the third road information by a majority vote based on two road information close to each other based on a result of the comparison by the road information comparison portion; and a comparison information storage portion configured to store information regarding the result of the comparison by the road information comparison portion in association with a location at which the road information is compared and an advancing direction of the vehicle, wherein the comparison information storage portion stores a method for changing the recognition by the external world recognition sensor in association with the location at which the road information is compared, when the road information comparison portion determines that the first road information and the second road information match each other and the third road information is different from the first road information and the second road information.

2. The vehicle control apparatus according to claim 1, wherein the road information determination portion determines that an incorrect recognition by the external world recognition sensor has occurred, when the road information comparison portion determines that the first road information and the second road information match each other and the third road information is different from the first road information and the second road information.

3. The vehicle control apparatus according to claim 1, wherein the road information determination portion determines that an error is contained in the information regarding the map, when the road information comparison portion determines that the second road information and the third road information match each other and the first road information is different from the second road information and the third road information.

4. The vehicle control apparatus according to claim 1, wherein the road information determination portion determines that the vehicle is running in a non-normal manner, when the road information comparison portion determines that the first road information and the third road information match each other and the second road information is different from the first road information and the third road information.

5. The vehicle control apparatus according to claim 1, wherein the road information comparison portion changes recognition processing by the external world recognition sensor when the vehicle runs again in the same direction as the advancing direction stored in association with the location at which the road information is compared.

6. The vehicle control apparatus according to claim 5, wherein the road information comparison portion changes a processing content of traffic lane recognition processing by the external world recognition sensor, when the vehicle runs again at the location determined by the road information comparison portion to have a shape varying in a lateral direction with respect to the advancing direction of the vehicle based on the difference between the third road information, and the first road information and the second road information.

7. The vehicle control apparatus according to claim 5, wherein the road information comparison portion changes a processing content of object recognition or slope recognition by the external world recognition sensor, when the vehicle runs again at the location determined by the road information comparison portion to have a shape varying in a longitudinal direction with respect to the advancing direction of the vehicle based on the difference between the third road information, and the first road information and the second road information.

8. The vehicle control apparatus according to claim 1, wherein the comparison information storage portion stores information contained in the map after correcting it in correspondence with the location at which the road information is compared, when the road information comparison portion determines that the second road information and the third road information match each other and the first road information is different from the second road information and the third road information.

9. The vehicle control apparatus according to claim 1, wherein the comparison information storage portion stores information regarding matching between a position of the vehicle and the map after correcting it in correspondence with the location at which the road information is compared, when the road information comparison portion determines that the second road information and the third road information match each other and the first road information is different from the second road information and the third road information.

10. The vehicle control apparatus according to claim 1, wherein the comparison information storage portion stores the information regarding the map after correcting it in correspondence with the location at which the road information is compared, when the road information comparison portion determines a plurality of times that the first road information and the third road information match each other and the second road information is different from the first road information and the third road information.

11. The vehicle control apparatus according to claim 1, wherein locations at which the first road information, the second road information, and the third road information are acquired, respectively, match one another.

12. The vehicle control apparatus according to claim 11, wherein the road information comparison portion compares the first road information, the second road information, and the third road information when the second road information is acquired.

13. The vehicle control apparatus according to claim 12, wherein the road information comparison portion sets a forward gazing time according to a driving characteristic of a driver, and compares the second road information acquired at a predetermined time, and the first road information and the third road information at the location that the vehicle reaches when the forward gazing time has elapsed since the predetermined time.

14. The vehicle control apparatus according to claim 1, wherein the second road information acquisition portion holds the acquired second road information for a predetermined time, and wherein the road information comparison portion compares the first road information, the second road information, and the third road information again while retrospectively focusing on a past earlier than during normal running when the first road information should be acquired, when the driver intervenes in steering during autonomous driving of the vehicle and there is a branch or a junction near a running location.

15. The vehicle control apparatus according to claim 1, wherein the second road information acquisition portion changes when the second road information is acquired according to whether the vehicle is under autonomous driving.

16. A vehicle control apparatus comprising:
a first road information acquisition portion configured to acquire first road information based on information regarding a map;
a second road information acquisition portion configured to acquire second road information based on a vehicle behavior;
a third road information acquisition portion configured to acquire third road information based on information recognized by an external world recognition sensor;
a road information comparison portion configured to compare the first road information, the second road information, and the third road information acquired from the first, second, and third road information acquisition portions, respectively;
a road information determination portion configured to determine accuracy of each of the first road information, the second road information, and the third road information by a majority vote based on two road information close to each other based on a result of the comparison by the road information comparison portion;
a comparison information storage portion configured to store a result of the determination by the road information determination portion in association with a location at which the road information is compared and an advancing direction of the vehicle; and
an autonomous driving control portion configured to autonomously drive the vehicle based on road information determined to be highly accurate when the vehicle has run last time among the first road information, the second road information, and the third road information stored in the comparison information storage portion, when the vehicle runs the location stored in the comparison information storage portion again,
wherein the comparison information storage portion stores a method for changing the recognition by the external world recognition sensor in association with the location at which the road information is compared, when the road information comparison portion determines that the first road information and the second road information match each other and the third road information is different from the first road information and the second road information.

17. A vehicle control method comprising:
acquiring first road information based on information regarding a map;
acquiring second road information based on a vehicle behavior;
acquiring third road information based on information recognized by an external world recognition sensor;
comparing the acquired first road information, second road information, and third road information;
determining accuracy of each of the first road information, the second road information, and the third road information by a majority vote based on two road information close to each other based on a result of the comparison by the comparing the road information; and
storing information regarding the result of the comparison by the comparing the road information in association with a location at which the road information is compared and an advancing direction of the vehicle,
wherein the storing information regarding the result of the comparison stores a method for changing the recognition by the external world recognition sensor in association with the location at which the road information is compared, when the comparing the road information determines that the first road information and the second road information match each other and the third road information is different from the first road information and the second road information.

18. The vehicle control method according to claim 17, further comprising storing information regarding the result of the comparison by the comparing the road information in association with the location at which the road information is compared and an advancing direction of the vehicle.

19. A vehicle control system comprising:
a navigation system configured to display information regarding a map;
a vehicle behavior detector configured to detect a vehicle behavior;
an external world recognition sensor configured to recognize information about an external world; and
a control unit,
wherein the control unit includes
a first road information acquisition portion configured to acquire first road information based on the navigation system,
a second road information acquisition portion configured to acquire second road information based on the vehicle behavior detector,
a third road information acquisition portion configured to acquire third road information based on the external world recognition sensor,
a road information comparison portion configured to compare the first road information, the second road information, and the third road information acquired from the first, second, and third road information acquisition portions, respectively,
a road information determination portion configured to determine accuracy of each of the first road information, the second road information, and the third road information by a majority vote based on two road information close to each other based on a result of the comparison by the road information comparison portion, and
a comparison information storage portion configured to store information regarding the result of the comparison by the road information comparison portion in association with a location at which the road information is compared and an advancing direction of the vehicle,
wherein the comparison information storage portion stores a method for changing the recognition by the external world recognition sensor in association with the location at which the road information is compared, when the road information comparison portion determines that the first road information and the second road information match each other and the third road information is different from the first road information and the second road information.

20. The vehicle control system according to claim 19, wherein the control unit further includes a comparison information storage portion configured to store information regarding the result of the comparison by the road information comparison portion in association with the location at which the road information is compared and an advancing direction of the vehicle.

21. A vehicle control apparatus comprising:
a first road information acquisition portion configured to acquire first road information based on information regarding a map;
a second road information acquisition portion configured to acquire second road information based on a vehicle behavior;
a third road information acquisition portion configured to acquire third road information based on information recognized by an external world recognition sensor;
a road information comparison portion configured to compare the first road information, the second road information, and the third road information acquired from the first, second, and third road information acquisition portions, respectively; and
a road information determination portion configured to determine accuracy of each of the first road information, the second road information, and the third road information by a majority vote based on two road information close to each other based on a result of the comparison by the road information comparison portion,
wherein locations at which the first road information, the second road information, and the third road information are acquired, respectively, match one another,
wherein the road information comparison portion compares the first road information, the second road information, and the third road information when the second road information is acquired, and
wherein the road information comparison portion sets a forward gazing time according to a driving characteristic of a driver, and compares the second road information acquired at a predetermined time, and the first road information and the third road information at a location that the vehicle reaches when the forward gazing time has elapsed since the predetermined time.

22. A vehicle control apparatus comprising:
a first road information acquisition portion configured to acquire first road information based on information regarding a map;
a second road information acquisition portion configured to acquire second road information based on a vehicle behavior;
a third road information acquisition portion configured to acquire third road information based on information recognized by an external world recognition sensor;
a road information comparison portion configured to compare the first road information, the second road information, and the third road information acquired from the first, second, and third road information acquisition portions, respectively; and
a road information determination portion configured to determine accuracy of each of the first road information, the second road information, and the third road information by a majority vote based on two road information close to each other based on a result of the comparison by the road information comparison portion,
wherein the second road information acquisition portion holds the acquired second road information for a predetermined time, and
wherein the road information comparison portion compares the first road information, the second road information, and the third road information again while retrospectively focusing on a past earlier than during normal running when the first road information should be acquired, when the driver intervenes in steering during autonomous driving of the vehicle and there is a branch or a junction near a running location.

* * * * *